(12) United States Patent
Hurren et al.

(10) Patent No.: US 6,788,681 B1
(45) Date of Patent: Sep. 7, 2004

(54) VIRTUAL PRIVATE NETWORKS AND METHODS FOR THEIR OPERATION

(75) Inventors: Alan J. Hurren, Nepean (CA); Joseph M. Regan, Sunnyvale, CA (US); Paul Bottorff, Palo Alto, CA (US); Mark Cobbold, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 09/513,244

(22) Filed: Feb. 25, 2000

Related U.S. Application Data

(63) Continuation-in-part of application No. 09/475,042, filed on Dec. 30, 1999, and a continuation-in-part of application No. 09/270,733, filed on Mar. 16, 1999.
(60) Provisional application No. 60/183,049, filed on Dec. 30, 1999.

(51) Int. Cl.[7] .............................................. H04L 12/56
(52) U.S. Cl. ...................................... 370/389; 370/392
(58) Field of Search ................................ 370/389–395, 370/466, 230, 400, 401, 350, 250, 423, 465; 709/223–227, 230–233, 243–249, 200; 345/629

(56) References Cited

U.S. PATENT DOCUMENTS

| | | | |
|---|---|---|---|
| 4,627,052 A | 12/1986 | Hoare et al. | |
| 5,684,800 A | 11/1997 | Dobbins et al. | |
| 5,862,338 A | * | 1/1999 | Walker et al. ............... 709/224 |
| 5,978,378 A | 11/1999 | Van Seters et al. | |

(List continued on next page.)

FOREIGN PATENT DOCUMENTS

| | | |
|---|---|---|
| WO | WO 95 01023 A | 1/1995 |
| WO | WO 99 00948 A | 1/1999 |

OTHER PUBLICATIONS

Alan Hurren et al., Transparent LAN Service Network Solution, Jan. 20, 1999, pp. 1–13.
Tom Downey, "Overview of Tag Switching", Electronics Industries Forum of New England, 1997, Professional Program Proceedings Boston, MA, USA May 6–8, 1997, New York, NY, USA, IEEE, US, May 6, 1997, pp. 61–66, XP010234255, ISBN: 0–7803–3987–8.
Haeryong Lee et al., "End–to–End QoS Arhitecture for VPNs: MPLS VPN Deployment in a Backbone Network", (Aug. 2000), Proceedings of the International Workshops on Parallel Processing, pp. 479–483.

*Primary Examiner*—Chi Pham
*Assistant Examiner*—Prenell Jones

(57) ABSTRACT

A method and apparatus for providing a Virtual Private Network (VPN) over a connectionless network connecting a plurality of Local Area Networks (LANs), such as an Ethernet network, is disclosed. The method and apparatus comprises associated each VPN with a unique identifier and each LAN of the VPN with a interface device connecting the LAN to the connectionless network, which may be for example, a Synchronous Optical Network (SONET). The interface device may service a plurality of LANs. Accordingly, each LAN is associated with a User-Network Interface that forms part of the interface device. Each data packet destined for a second LAN, such Ethernet frames, received by the interface device for a first LAN is encapsulated with, if known, a Media Access Control (MAC) address of the interface device connected to the second LAN, the VPN's unique identifier, and the port on the interface device connected to the second LAN. Additionally, the corresponding MAC and port address of the first interface device is also used to encapsulate the Ethernet frames. If the MAC and port address is not known (i.e., it is not stored in a database on the first interface device), the first interface device multicasts an encapsulated Ethernet packet to the entire VPN. The first interface device maintains (i.e., updates and appends) its database of MAC and port addresses in response to encapsulated data frames received by the first interface device.

46 Claims, 9 Drawing Sheets

U.S. PATENT DOCUMENTS

| | | | |
|---|---|---|---|
| 6,041,057 A | | 3/2000 | Stone |
| 6,085,238 A | * | 7/2000 | Yuasa et al. ............... 709/223 |
| 6,151,324 A | | 11/2000 | Belser et al. |
| 6,173,334 B1 | * | 1/2001 | Matsuzaki et al. .......... 709/245 |
| 6,175,571 B1 | * | 1/2001 | Haddock et al. ............ 370/423 |
| 6,185,214 B1 | | 2/2001 | Schwartz et al. |
| 6,205,488 B1 | | 3/2001 | Casey et al. |
| 6,414,958 B1 | | 7/2002 | Specht |
| 6,512,766 B2 | | 1/2003 | Wilford |
| 6,526,056 B1 | * | 2/2003 | Rekhter et al. ............. 370/395 |
| 6,577,642 B1 | * | 6/2003 | Fijolek et al. .............. 370/465 |

\* cited by examiner

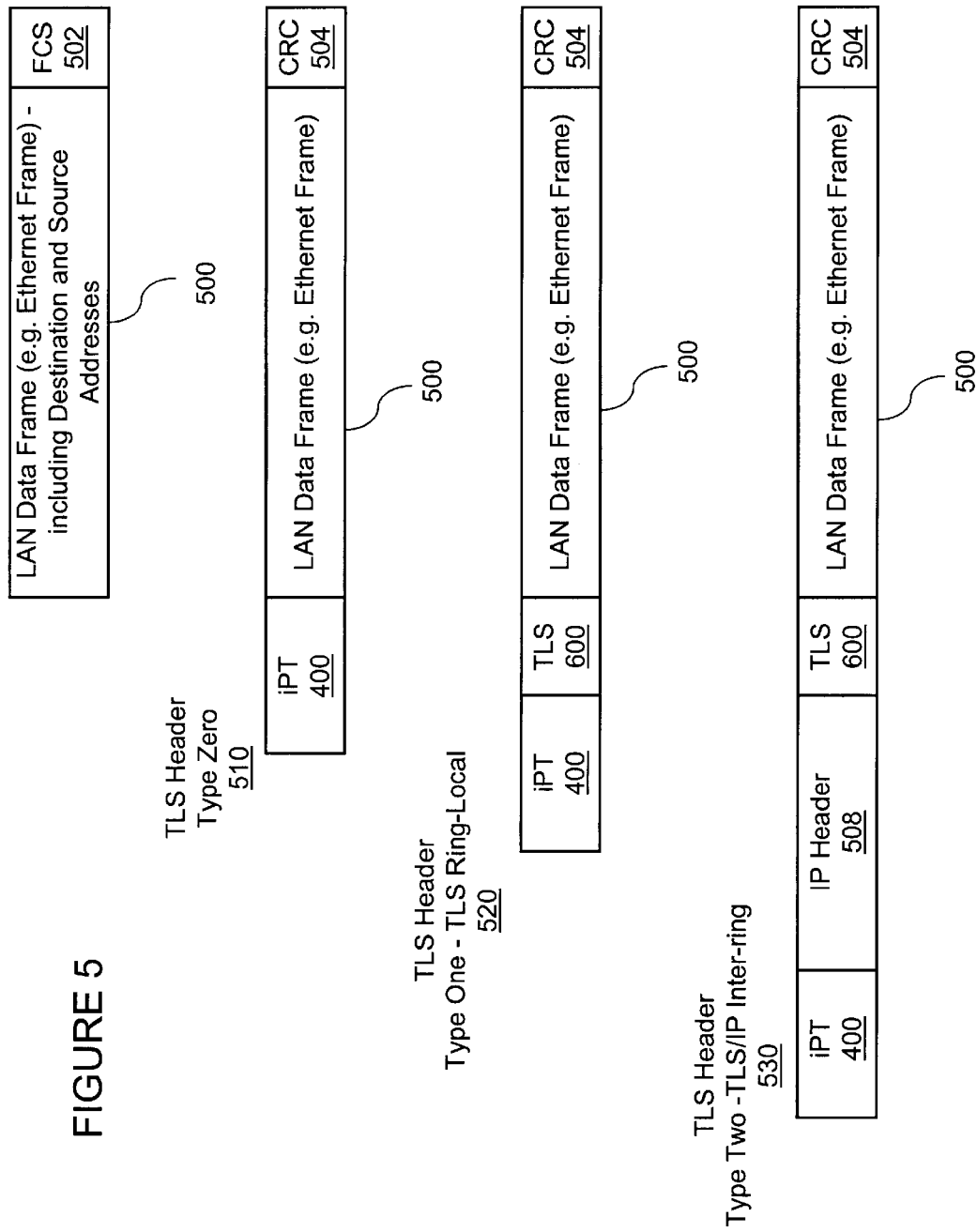

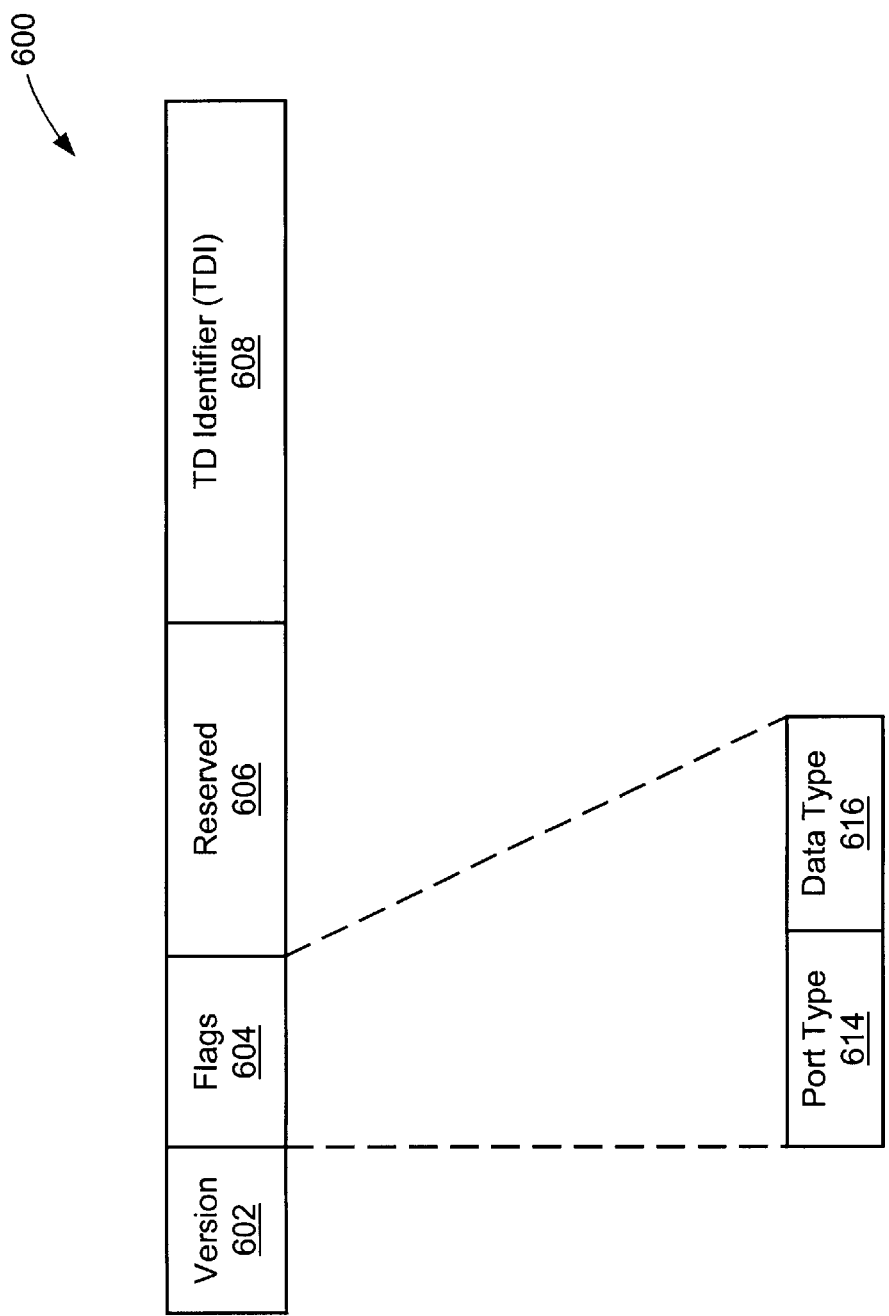

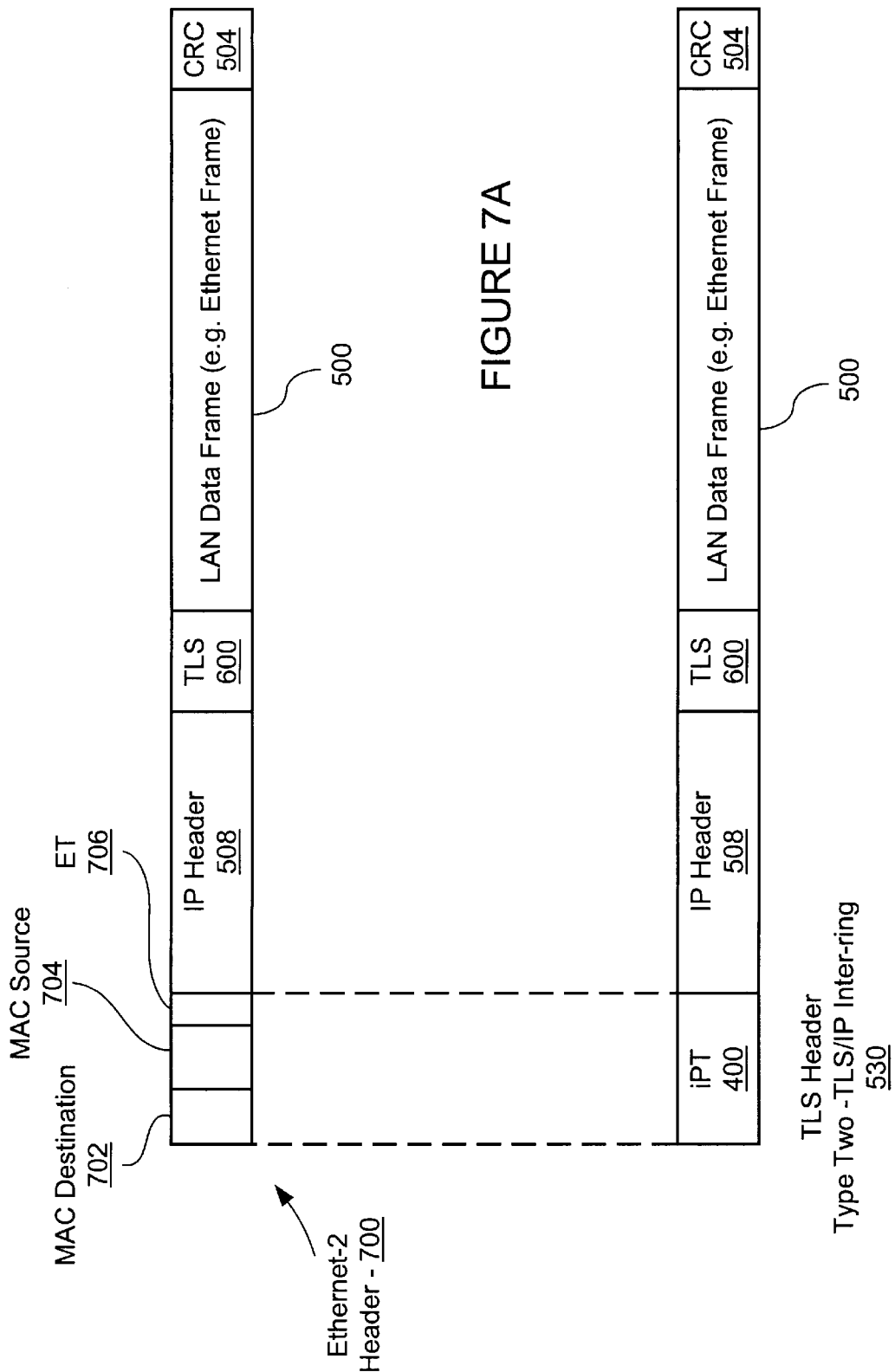

VIRTUAL PRIVATE NETWORKS AND METHODS FOR THEIR OPERATION

REFERENCE TO RELATED APPLICATIONS

This is a continuation in part application of application Ser. No. 09/475,042 (now No. 60/183,049) filed Dec. 30, 1999, and is a continuation in part application of application Ser. No. 09/270,733 filed Mar. 16, 1999, both entitled "Virtual Private Networks and Methods for their Operation" the contents of which are hereby incorporated herein.

FIELD OF THE INVENTION

This invention relates to Virtual Private Networks (VPNs) and methods of their operation. More particularly, this invention relates to methods and apparatus enabling Network Service Providers (NSPs) to provide virtual local area networks (VLANs) services to groups of customers.

BACKGROUND TO THE INVENTION

Transparent LAN Service (TLS) is a data service offered by carriers (such as Bell™ Canada, AT&T™ and MCIWORLDCOM™) today through equipment provided by a variety of manufacturers (such as, for example, Nortel Networks™). The TLS provides native LAN connectivity between several LANs at geographically dispersed sites. The demand for TLS is growing rapidly.

A TLS is typically offered in a metropolitan area including neighboring municipalities. The service and the network to provide the service can be characterized as a virtual private networking service. An individual customer's transparent LAN or VPN, comprised of many LAN sites dispersed across a geographical area, must be secure and separated from other customer's transparent LANs. A customer's sites scattered across a metro area are linked together by the TLS forming a VPN—a group of interconnected LANs that appears to the user as a single, co-located LAN—and are isolated from other VPNs provided by the TLS carrier.

Typically a user's interface to a Transparent LAN Service is a conventional LAN networking protocol such as, for example, Ethernet. TLS is transparent in that the customer appears to access to its own networking media (such as Ethernet) when in reality the media is a shared network with mechanisms to separate the traffic from different VPNs.

Many conventional implementations of the TLS service have been provided using a connection oriented approach. This connection oriented approach typically involves the use of Asynchronous Transfer Mode (ATM) service access Multiplexers (MUXes), ATM switches and Synchronous Optical Network (SONET) add/drop multiplexers (ADMs). However, this connection oriented approach encounters severe scaling problems due, in part, to Permanent Virtual Circuit (PVC) proliferation. Provisioning a fully associated or meshed connection oriented network (that is each node, such as a LAN, is able to communicate with each other node or LAN in the VPN) results in a significant increase in the number of connections, such as PVCs. Moreover, typical PVCs are provisioned to a customer based on a customer's maximum bandwidth requirement. However, since data traffic is typically "bursty" and the dedicated circuits or connections typically provide a fixed bandwidth, the dedicated connections are frequently operating below capacity.

Moreover, the EEE 802.1 standard, the contents of which are hereby incorporated herein, defines a protocol that enables an Ethernet LAN to be partitioned in multiple virtual LANs (VLANs) through the use of a VLAN tag carried in the header of each frame of data. The VLAN tag identifies the VLAN for which the data frame is intended. However, this VLAN tag, defined in the IEEE 802.1 standard as having a twelve bit capacity, limits the number of distinct VLANs that a carrier, also known as a Network Service Provider (NSP), can accommodate to 4095 ($2^{12}$-1) VLANs.

Accordingly, a TLS service that enables a carrier to support many (i.e., more than 4095) Virtual Private Networks (VPNs) and a TLS which is scalable and easy to administer is desired.

SUMMARY OF THE INVENTION

A method and an apparatus is disclosed providing Virtual Private Networks (VPNs) to be provisioned over a connectionless network. The method and apparatus provides for a large number VPNs to be provisioned (at least $2^{24}$ VPNs and as many as approximately $2^{40}$ VPNs).

Conventional LAN data frames (such as Ethernet frames) are received by an apparatus (an interWAN Packet Transport—iPT card) embodying one aspect of the invention. This receiving or "ingress" iPT card connects a conventional LAN to a wide area transport media such as, for example, a SONET network. Each LAN data frame received will include a destination address of the ultimate destination (for example, a destination media access control—MAC— address, which is a hardware level address that uniquely identifies each node in a network). Based on the destination address incorporated in the LAN data frame, the iPT card will attempt to retrieve address information corresponding to an "egress" iPT card from a stored database (the egress iPT card being connected to the LAN including the ultimate destination). If the ingress iPT card's database has such information, then the LAN data frame is encapsulated in a packet including the retrieved address information. If the egress iPT card is connected to the same transport media as the ingress iPT card (e.g., the iPT cards are connected to the same SONET ring), the address information may include a destination MAC address for the egress iPT card. If the egress iPT is not connected to the same transport media as the ingress iPT card (e.g., the two iPT cards are connected to separate SONET rings), the address information may also contain a secondary destination address such as, for example, an Internet Protocol (IP) address in addition to the other information (e.g., the MAC address of the egress iPT card). The encapsulated LAN data frame will then be routed to the egress iPT card and then to its ultimate destination.

In the event that the ingress iPT card does not include an entry corresponding to the address specified in the destination address portion of the received LAN data frame, a multicast address will be used to encapsulate the received LAN data frame. These multicast encapsulated data frames are then transmitted to all egress iPT cards servicing the particular VPN.

On receipt of an encapsulated LAN data frame, an egress iPT card strips off the header portion, thereby regenerating the original LAN data frame, and forwards this regenerated LAN data frame to its ultimate destination. The header stripped from the encapsulated LAN data frame received by the egress iPT card is then used to populate the egress iPT card's database. This database uses the address information of the source of the LAN data frame (i.e., the source address of the original sending entity and the address information of the ingress iPT card) for LAN data frames received by the egress iPT card for transmission to another iPT card.

According to one aspect of the invention, there is provided a system of providing communication between a first and a second Local Area Network (LAN), the first and second LANs interconnected by a connectionless network, the system comprising: a first network interface connecting the first LAN to the connectionless network, the first receiving device for: receiving conventional LAN data frames; determining an address of a second network interface responsive to destination information in the received conventional LAN data frames, the second network interface connecting the second LAN to the connectionless network; and encapsulating the conventional LAN data frames received at the first network interface with the address of the second network interface; a router for routing the conventional LAN data frames encapsulated with the address to the second network interface over the connectionless network; the second network interface connecting the second LAN to the connectionless network, the second network interface for: receiving conventional LAN data frames encapsulated with the address; re-generating the conventional LAN data frames from the conventional LAN data frames encapsulated with the address; and transmitting the re-generated conventional LAN data frames to the second LAN; and wherein the determining comprises: determining an identifier uniquely identifying a virtual private network (VPN) comprising at least the first and second LANs; accessing a routing table stored at the first network interface; where possible, retrieving, from the routing table a unique address of the second network interface responsive to a destination address stored in the received LAN data frames and the determined identifier, the unique address comprising an EP address; and if the routing table does not contain the unique address for the destination information, retrieving a multicast address, the multicast address representative of all LANs forming part of the VPN and comprises an IP multicast address; and wherein the encapsulating comprises encapsulating the conventional LAN data frames with the determined identifier and one of the unique address of the second network interface and the multicast address.

According to one aspect of the invention, there is provided a device providing communication between a first and a second Local Area Network (LAN), the first and second LANs in communication by a connectionless network, the device comprising: an input interface in communication with the first LAN; an output interface in communication with the connectionless network; a storage media storing data frames received from the first LAN received via the input interface, data packets and frames for transmission to the second LAN through the output interface; and a processor, the processor adapted to: receive conventional LAN data frames received from the first LAN through the input interface, the received data frames destined for the second LAN; determine, responsive to the received conventional LAN data frames, routing information for routing the received conventional LAN data frames to the second LAN, the routing information comprising an Internet Protocol (IP) address; encapsulate the received conventional LAN data frames with the routing information; transmit the encapsulated conventional LAN data frames to the connectionless network over the output interface; receive encapsulated conventional LAN data frames from the connectionless network from the output interface; generate conventional LAN data frames from the received encapsulated conventional LAN data frames; and transmit the generated conventional LAN data frames to the first LAN by the input interface.

According to one aspect of the invention, there is provided a method of transmitting conventional Local Area Network (LAN) data frames from a first to a second LAN, the first and second LAN interconnected by a connectionless medium, the method comprising: receiving the conventional LAN data frames from the first LAN destined for the second LAN; determining, responsive to the received conventional LAN data frames, routing information for transmittal of the conventional LAN data frames to the second LAN; encapsulating the received conventional LAN data frames with the routing information; transmitting the encapsulated received conventional LAN data frames to the connectionless medium; receiving encapsulated conventional LAN data frames from the connectionless medium destined for the first LAN; generating conventional LAN data frames responsive to the received encapsulated conventional LAN data frames; and transmitting the generated conventional LAN data frames to the first LAN; wherein the determining routing information comprises: determining an identifier uniquely identifying a VPN comprising the first LAN and second LAN; determining from the received conventional LAN data frames the destination for the received conventional LAN data frames; and retrieving, from a database and responsive to the determined destination, an Internet Protocol (IP) address of an egress location forming part of the connectionless medium servicing the determined destination, if the database does not contain an entry for the determined destination, the retrieved address comprising an IP multicast address comprising egress locations servicing the VPN.

According to one aspect of the invention, there is provided a method for facilitating communication in a virtual private network (VPN), the VPN comprising a plurality of local area networks (LANs) each interconnected through a network interface to a connectionless network, comprising, at a first network interface of a first LAN of the VPN: receiving conventional LAN data frames on the first LAN, the conventional LAN data frames having destination information; determining an identifier uniquely identifying the VPN; searching a routing table with the destination information and the identifier for a unique IP address of another network interface of another LAN of the VPN; if the routing table does not contain the unique address, retrieving a multicast IP address for all network interfaces of the plurality of LANs of the VPN; encapsulating the conventional LAN data frames with the identifier and one of the unique IP address and the multicast IP address; and transmitting the encapsulated frames on the connectionless network.

According to one aspect of the invention, there is provided a first network interface for a first local area network (LAN) of a virtual private network (VPN), the VPN comprising a plurality of LANs each interconnected through a network interface to a connectionless network, comprising: means for receiving conventional LAN data frames on the first LAN, the conventional LAN data frames having destination information; means for determining an identifier uniquely identifying the VPN; means for searching a routing table with the destination information and the identifier for a unique address of another network interface of another LAN of the VPN, the unique address comprising an EP address of the another network interface; means for, if the routing table does not contain the unique address, retrieving a multicast address for all network interfaces of the plurality of LANs of the VPN, the multicast address for the all network interfaces comprising a multicast IP address; means for encapsulating the conventional LAN data frames with the identifier and one of the unique address and the multicast address; and means for transmitting the encapsulated frames on the connectionless network.

According to one aspect of the invention, there is provided a Virtual Private Network (VPN) data signal embodied on a carrier wave, the VPN data signal generated from a received conventional LAN data frame, the conventional LAN data frame comprising a LAN destination address, a LAN source address, a LAN payload and a LAN error checking portion, the VPN data signal comprising: an egress destination address of an egress network interface, the egress network interface servicing an egress destination corresponding to the LAN destination address and wherein the egress destination address comprises an Internet Protocol (IP) address; an ingress source address of an ingress network interface, the ingress network interface servicing an ingress source corresponding to the LAN source address and wherein the ingress source address comprises an IP address; the LAN destination address; the LAN source address; the LAN payload; and an error checking portion generated from the egress destination address, the ingress source address, the LAN destination address; and the LAN source address and the LAN payload.

According to one aspect of the invention, there is provided a system of providing communication between a first and a second Local Area Network (LAN), the first and second LANs interconnected by a connectionless network, the system comprising: a first network interface connecting the first LAN to the connectionless network, the first receiving device for: receiving conventional LAN data frames; determining an address of a second network interface responsive to destination information in the received conventional LAN data frames, the second network interface connecting the second LAN to the connectionless network; and encapsulating the conventional LAN data frames received at the first network interface with the address of the second network interface; a router for routing the conventional LAN data frames encapsulated with the address to the second network interface over the connectionless network; the second network interface connecting the second LAN to the connectionless network, the second network interface for: receiving conventional LAN data frames encapsulated with the address; re-generating the conventional LAN data frames from the conventional LAN data frames encapsulated with the address; and transmitting the re-generated conventional LAN data frames to the second LAN; and wherein the determining an address comprises: determining an identifier uniquely identifying a virtual private network (VPN) comprising at least the first and second LANs; accessing a routing table stored at the first network interface; where possible, retrieving, from the routing table a unique address of the second network interface responsive to a destination address stored in the received LAN data frames and the determined identifier; and if the routing table does not contain the unique address for the destination information, retrieving a multicast address, the multicast address representative of all LANs forming part of the VPN and comprises an IP multicast address; and wherein the encapsulating comprises encapsulating the conventional LAN data frames with the determined identifier and one of the unique address of the second network interface and the multicast address; and wherein the routing comprises: receiving the encapsulated conventional LAN data frames at a first Network Network Interface (NNI) of the router; modifying the encapsulated conventional LAN data frames to have a conventional LAN data frame header and LAN data frame payload, the modified encapsulated conventional LAN data frame recognizable by a conventional routing switch of the router; routing, by the routing switch, the modified encapsulated LAN data frame to a second NNI of the router; generating, at the second NNI, an encapsulated conventional LAN data frame from the modified encapsulated data LAN data frame; and transmitting the generated encapsulated conventional LAN data frame to the second network interface.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood after reference to the following detailed specification read in conjunction with the drawings wherein:

FIG. 5 is a schematic of data structures embodying additional aspects of the present invention and used in the network of FIG. 2A;

FIG. 6 is a schematic of a data structure forming part of some of the data structures of FIG. 5;

FIG. 7A is a schematic of a data structure embodying an aspect of the present invention and used in the network of FIG. 2B.

DESCRIPTION OF THE PREFERRED EMBODIMENT

Figure 1:
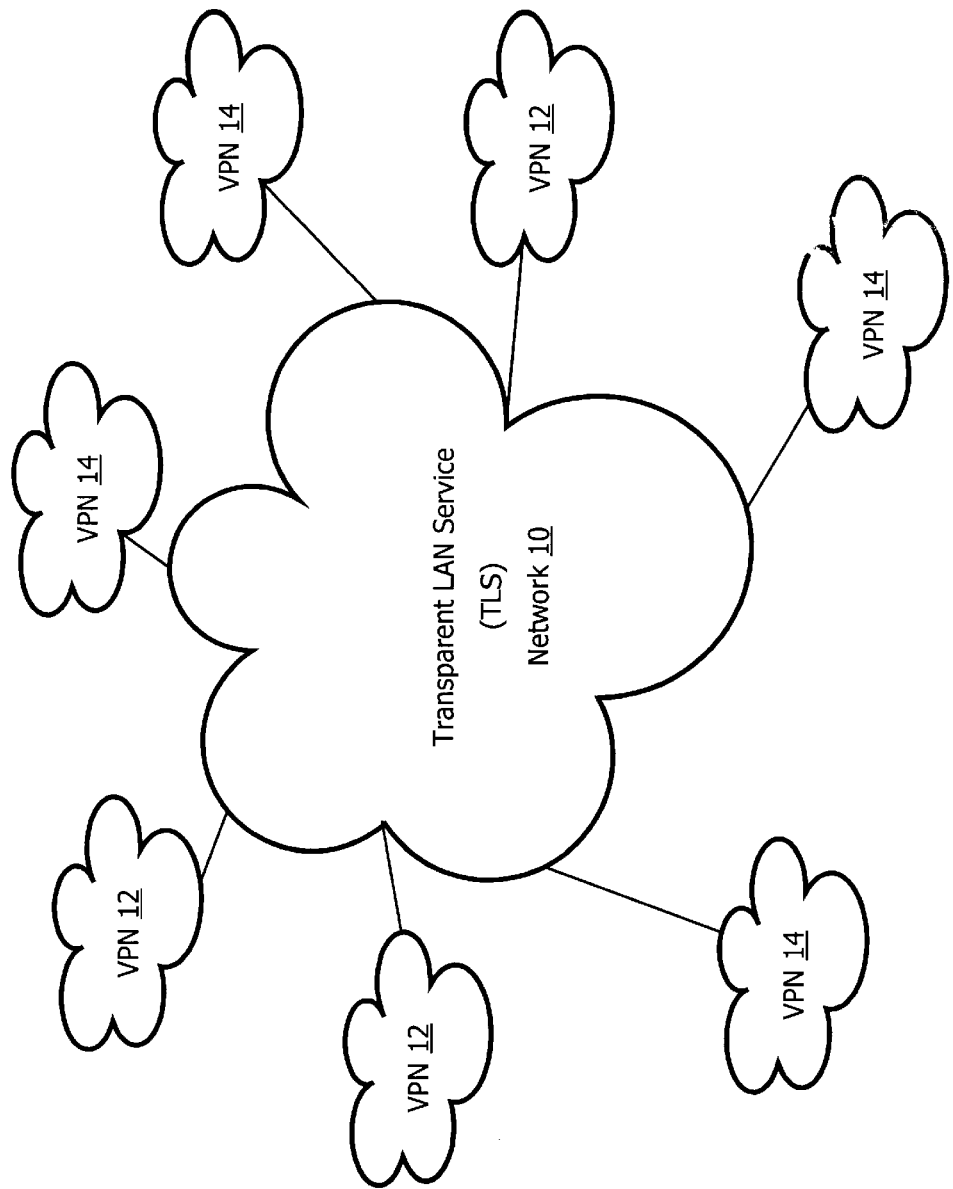
FIG. 1 is a schematic of a Transparent LAN Service network.

FIG. 1 illustrates an interWAN Packet Network (iPN) 10, that embodies one aspect of the instant invention. iPN 10 provides TLS to a plurality of customers (two as illustrated in FIG. 1). iPN 10 provides communication between a first customer's VPN 12 comprising a plurality of LANs that are typically dispersed across a large geographical area. The communication between LANs comprising VPN 12 is private, or separated from, the communication between a second customer's VPN 14 which is also comprised of a plurality of separated LANs.

iPN 10 is a connectionless network, such as an Internet Protocol (IP) network. That is, no hard-wired or virtual connections exist between any two points, such as the LANs comprising VPNs 12 or 14, nor are these connections provided by iPN 10. Rather data packets or frames are individually and dynamically routed from a source to a destination through the packet switches forming iPN 10.

The present invention is designed to accommodate the desire for customers to have their LANs communicate over relatively small geographical areas, such as a metropolitan area, or much larger geographical areas, such as an entire country or even larger areas.

Figure 2A:
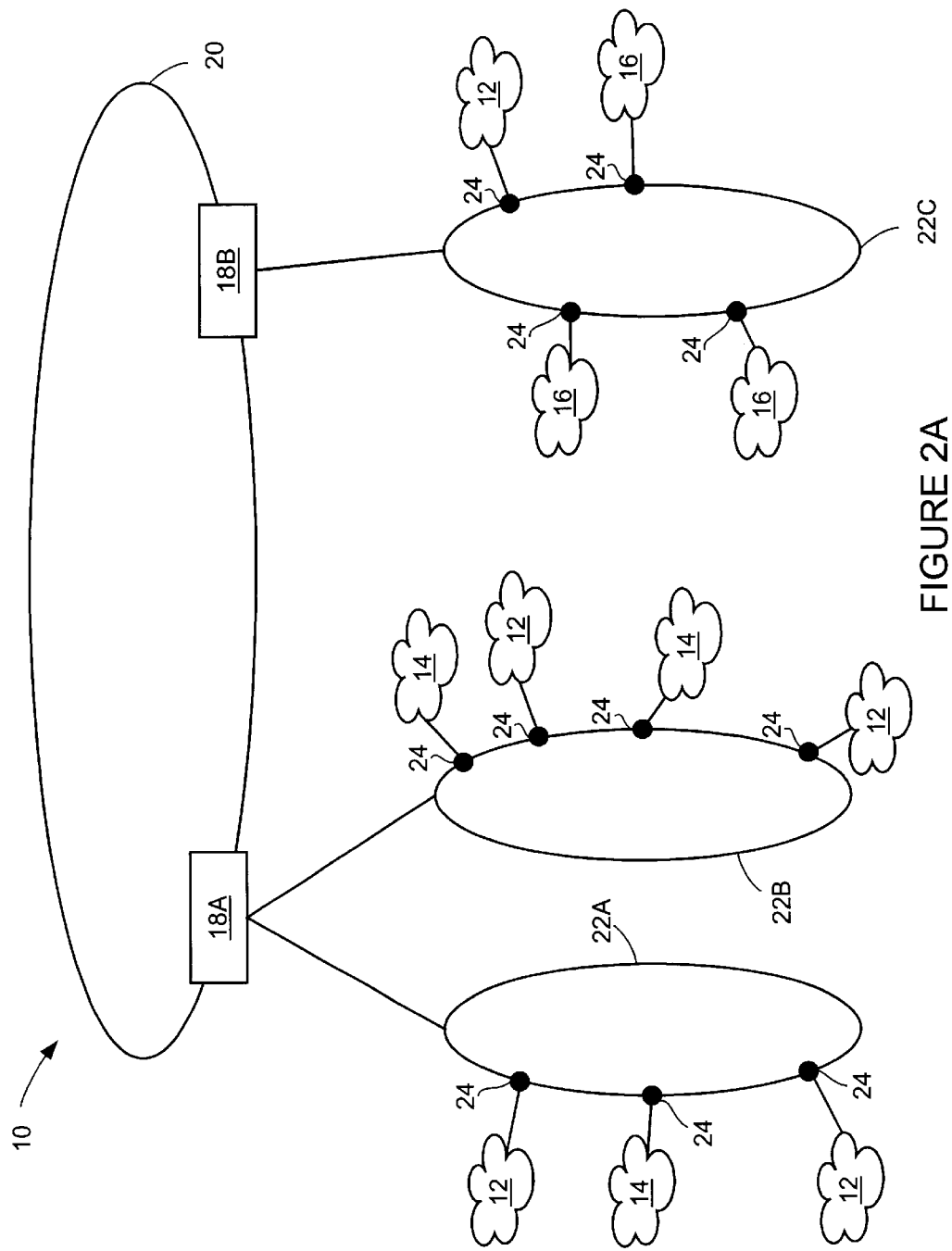
FIG. 2A is a schematic of a portion of the TLS network of FIG. 1.

FIG. 2A illustrates in greater detail a first embodiment of the iPN 10. iPN 10 comprises a plurality of VPNs 12, 14 and 16 interconnected through a plurality of local rings 22A, 22B and 22C (collectively local rings 22). Local rings 22 inter-communicate through inter-ring 20. Local rings 22 and inter-ring 20 may be, for example, a SONET network or other network type that is capable of carrying the data packets described herein. As will be appreciated by those skilled in the art, local rings 22A, 22B and 22C are only exemplary and the TLS described herein may be implemented over other network types capable of carrying data packets such as, for example, Ethernet frames or IP frames, as long as the User-Network Interface (UNI) and Network-Network Interface (NNI) functions described herein are implemented on a network element(s) forming part of a network.

The embodiment illustrated in FIG. 2A has VPN 16 comprised of three LANs in communication with local ring 22C, VPN 14 comprising three LANs—two in communication with local ring 22B and the third in communication with local ring 22A, and VPN 12 comprising five LANs—two in communication with local ring 22A, two in communication local ring 22B and the last LAN in communication with local ring 22C. The LANs comprising VPNs 12, 14 and 16 transmit to and receive data from local rings 22 through multiplexers 24 equipped with both: (1) LAN networking protocol interfaces, such as Ethernet interfaces; and (2) a packet switching interface. Multiplexers 24, hereinafter referred to as interWAN Packet Transport (iPT) cards 24, may be, for example, modified SONET ADMs. The modifications, which implement the methods and apparatus described herein, may include hardware and/or software modifications to conventional SONET ADMs. Local rings 22 communicate with inter-ring 20 through central offices (CO) 18A and 18B (collectively COs 18). COs 18 incorporate routing switches, such as, for example, Ethernet or IP routing switches, to route packets transmitted between local rings 22.

Figure 2B:
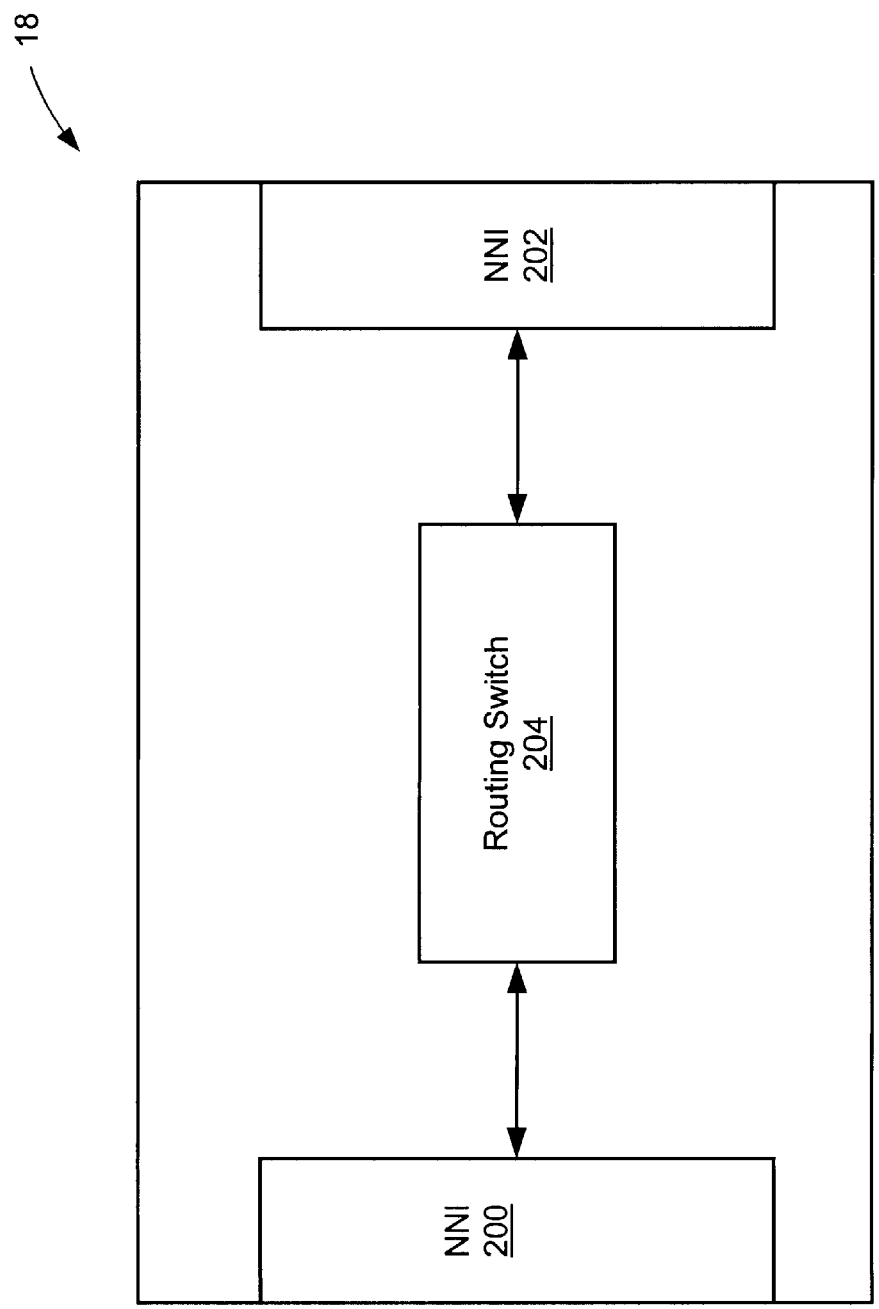
FIG. 2B is a detailed schematic of a portion of the network of FIG. 2A.

An exemplary CO 18 is illustrated in greater detail in FIG. 2B. CO 18 comprises a first NNI 200 in communication with a conventional routing switch 204. Routing switch 204 is also in communication with a second NNI 202. First and second NNIs 200, 202 perform functions described herein and are each in communication with a ring 22 or inter-ring 20.

VPN 16, which comprises three LANs all in communication with a single local ring 22C, can be described as operating as a local ring TLS. VPNs 12 and 14, which, as described below, operate as a TLS/IP inter-ring TLS.

Generally, and described in greater detail below, a VPN and a broader TLS implemented in accordance with the invention disclosed herein can operate as a local ring TLS, which provides for local bridging when all of the LANs comprising the VPN are in communication with a single local ring 22, or the VPN can operate as a TLS/IP inter-ring VPN which provides an inter-ring solution with improved scaling properties when compared to a connection oriented transparent LAN service. As the name implies, a TLS/IP implementation of the present invention uses the internet protocol (IP) together with IP Learning Tunnels (IPLT) described hereinafter. Using IP leverages the inherent scalability of IP routing by using an IP routed network backbone for iPN 10. The present invention uses IP encapsulation and IP routing and multicasting to encapsulate layer two (L2) traffic over an EP network. Further, using the dynamic learning technique, described as IPLT, ensures traffic from separate VPNs, such as VPNs 12, 14 and 16, is kept separate from each other thus providing the "private" aspect of a VPN. Moreover, the IPLT technique offers simple provisioning by dynamically creating routing tables based on traffic flow and provides efficient use of the bandwidth provided by a local ring 22 or an inter-ring 20.

Accordingly, a TLS is provided by iPN 10 by providing the capability to separate and transport customer data frames, such as Ethernet frames, across a shared network, such as iPN 10. A customer's data frames (hereinafter referred to as Ethernet frames for simplicity although other networking protocols can also be used) are encapsulated and routed over the IP backbone between the various LANs that comprise the VPN. Consequently, a user can subscribe to a VPN offered by a carrier's TLS implementing the present invention to connect all its different physical sites into an apparently single LAN (as viewed by the customer). Alternatively, a customer may subscribe to a VPN offered by a carrier's TLS to transport traffic between selected sites or, if desired, a group of separate customers, such as a plurality of suppliers and their customer(s), may subscribe to form a single VPN connecting these different organizations.

Each of a customer's LANs will be connected to local ring, such as a local ring 22 which may be, for example, a SONET ring. The LANs will connect to a local ring through an iPT card 24. Each iPT card can have a plurality of virtual ports, such as Ethernet ports, mapping on to a plurality of physical ports. Each TLS virtual port on the iPT card can be individually configured to operate as a User-Network Interface (UNI) port—an interface between a customer's LAN and a local ring—or a Network-Network Interface (NNI) port—a port used to interconnect separate rings (e.g., local rings 22 or inter-ring 20).

In operation and without limiting the subsequent description contained herein, a UNI port may be dedicated to a particular customer and a particular customer's LAN. Each UNI port will be configured with a unique address (e.g., an IP address), which provides a unique address for the virtual port on that particular VPN. Moreover, each iPT card 24 will be provisioned with a unique address (e.g., an EP address). Each VPN will be assigned a unique TLS Domain (TD) identifier (TDI). Accordingly, every UNI port forming part of a single VPN or TLS domain will use the same TDI. Therefore, a LAN forming part of a VPN can be identified by the IP address of its associated iPT card 24 and the address for the UNI port of the card servicing the LAN. Further, the entire VPN will be identified on iPN 10 (FIG. 1) by a unique TDI. Finally, each TD will also be associated with a multicast group address which will be used to multicast a message to the entire domain. As described in greater detail below, the multicast group address will take either the form of an EP multicast group address when the VPN has member LANs connected to a plurality of local rings (i.e., the VPN operates as an inter-ring VPN) or a TLS local ring multicast group address (i.e., the VPN operates as a local ring VPN). A multicast group address (i.e., either an EP or TLS multicast address) will be used during the dynamic learning of addresses of other members of a TD. It may be desirable to map a multicast group address directly to its associated TDI (i.e., the multicast group address maps 1:1 to the TDI for a particular TD). It should also be noted that since iPT cards 24 form part of their associated LANs, each iPT card will, like all other networked devices on a LAN, have a unique Media Access Control (MAC) address. As is known by those skilled in the art, a MAC address is a hardware level forty-eight bit address that uniquely identifies each node in a network.

An IP multicast group address is used in the circumstance where the sending entity (i.e., the sending device forming part of the source LAN) desires to transmit data to a second entity having a MAC address that may be known by the sending entity and a unicast IP address which is unknown to the sending iPT card and the sending entity forms part of a given inter-ring VPN.

In the above-noted circumstance (i.e., an unknown unicast IP address), the sending customer transmits Ethernet frames from a first LAN on a first local ring, such as local ring 22C, to a receiving device which is located on a second LAN and which may possibly be on a second local ring, such as local ring 22A. The data frame transmitted by the sending entity is received by a local UNI port forming part of the iPT card 24 connecting the sending LAN to its local ring. Since the destination for the received data frame may be destined for a receiving device located on a separate local ring, the received Ethernet frame for ingress into the local ring 22C (the "ingress frame") will be encapsulated by the ingress iPT card 24 into an TLS/IP packet 530 (FIG. 5) with an IP multicast group address inserted into its IP header. This encapsulated packet is then flooded and transmitted to all members of the multicast group on the iPN 10 whether or not such a card forming part of the given inter-ring VPN is on the same ring as the sending card. Accordingly, each iPT card 24 forming part of the given VPN or TD will receive the multicast TLS/IP packet and will extract the encapsulated data frame (such as, for example, an Ethernet frame). The extracted data frame will then be transmitted to the LAN serviced by the UNI port of each egress iPT card which is part of the given VPN. The destination device will be on one of these LANs and this device will read the extracted data frame. Each iPT card has a filtering database routing table (FDRT). Each iPT card of the given VPN updates its FDRT to include an entry for the MAC address of the source device in association with the MAC address, UNI port address, and IP address of the ingress iPT card (unless its FDRT already has such an entry). The encapsulated TLS/IP packet transmitted by this multicast and received by iPT cards 24 that do not service the given VPN will discard the packet.

When an ingress iPT card receives a frame, it first searches its FDRT with the destination MAC address. If an entry is found, the ingress iPT card can unicast the frame to the EP address of an iPT card associated with the destination MAC address.

Furthermore, on ingress, the ingress iPT card 24 will analyze the incoming data frame transmitted from the sending entity to "learn" about the network devices connected to the LAN serviced by the iPT card (i.e., the "local" network devices). The data gathered from this analysis will be stored in the FDRT, also referred to as a Destination Address Association Table (DAAT) in parent application Ser. No. 09/270,733. Using the information stored in the FDRT, an iPT card 24 receiving an ingress frame that is destined for a receiving device serviced by the same iPT card (i.e., the sending device and the receiving device are part of the same LAN) will be ignored and not forwarded by the iPT card 24.

Figure 7B:
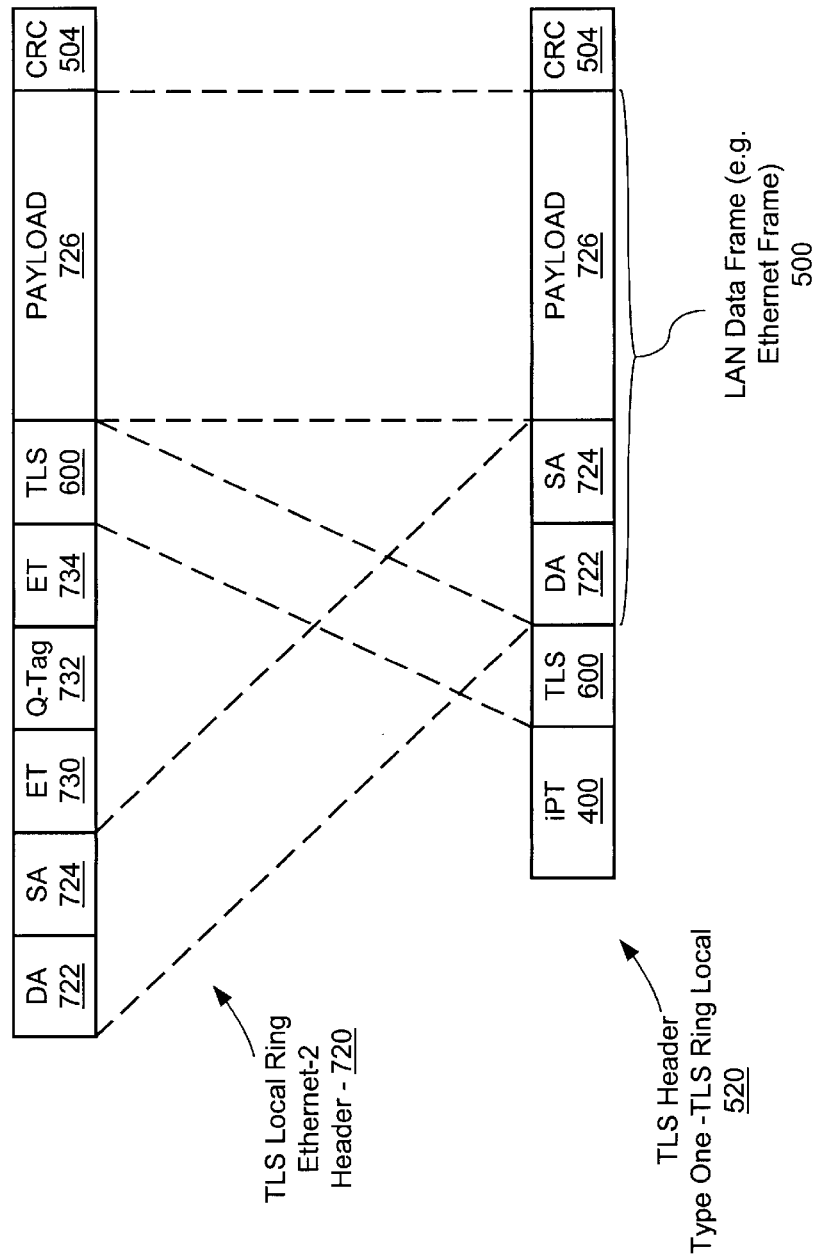
FIG. 7B is a schematic of a data structure embodying an aspect of the present invention and used in the network portion of FIG. 2B.

TLS/IP packets which are transmitted between local rings will first pass through a first NNI port 200 (FIG. 2B) of an iPT card forming part of CO 18B for example, connecting a local ring, such as ring 22C, to inter-ring 20. The TLS/IP packets are translated into a format (described in greater detail with reference to FIG. 7A) which can be accepted and processed by routing switch 204 and then passed to a second NNI 202 where the translated packet is translated back into a TLS/IP packet. These "re-translated" TLS/IP packets then pass from inter-ring 20 to a second local ring, such as ring 22A, via a first NNI port 200, routing switch 204 and a second NNI 202 of a second iPT card 24 forming part of CO 18A connecting local ring 22A to inter-ring 20. The translation from a TLS/IP packet into a format acceptable to a routing switch 204 forming part of CO 18A and then back to a TLS/IP packet is again performed. These inter-ring TLS/IP packets are then transmitted to a destination LAN through a UNI port of an iPT card connecting local ring 22A to the destination LAN.

As described above, upon receipt at an iPT card (the egress iPT card) of a TLS/IP encapsulated frame destined for a device connected to a given iPT card, the TLS/IP packet will egress from a local ring to the attached LAN ("egress packets"). These egress packets are stripped of their TLS/IP header and transmitted as Ethernet frames to the UNI port of the egress iPT card 24 servicing the LAN which has the destination device as a member. At this point, the UNI port receiving the egress packets will analyze the stripped TLS/IP header and from this IP header form an association between the sending entity's source MAC address and the ingress iPT card's IP and the MAC addresses and UNI (or NNI) port address of the ingress iPT card or NNI (if an intermediate router was required) servicing the sending entity which will then be stored in the FDRT. Once this association has been formed, the egress iPT card (now operating as an ingress iPT card) can transmit encapsulated Ethernet frames specifying the original sending entity's MAC address directly to the original sending entity by encapsulating the Ethernet frame in a TLS/IP packet with the unicast IP address of the original sending entity's iPT card, the MAC address and the UNI (or NNI) port servicing the original sending entity (or NNI if an intermediate router was required) all of which has been retrieved from the FDRT. From the foregoing, it is apparent that the present invention "learns" the addresses of other members of TD as each UNI port receives TLS/IP messages. This dynamic aspect of the invention simplifies the administration of a TD or VPN using the TLS described herein when compared to conventional TLS. This learning aspect of the invention is described in greater detail in application Ser. No. 09/270,733. In an alternative embodiment, each TLS/IP frame generated could be addressed to a specific UNI port, rather than to an iPT card (which may service several UNI ports).

In TLS local ring mode, the process described above is the same with the exception that entries in an iPT card's FDRT for TLS local ring mode VPNs do not include an IP address since the IP protocol is not used in TLS local ring mode. Thus, the process involves multicasting on the ring if the ring address of a destination device is unknown, learning the ring address and unicasting in respect of the learned addresses. In operation, for a data frame with a TLS having a known destination MAC address (i.e., the MAC address of the destination/receiving entity is known) but the egress iPT card's address information is unknown (i.e., there is no entry in the ingress iPT card's FDRT for the egress iPT card's MAC address or destination port), the ingress Ethernet frame will be encapsulated in a data packet 520 (FIG. 5) having a TLS ring local header. This encapsulated data frame, with the TLS local ring multicast group address, will be flooded to all iPT cards connected to the local ring forming part of the VPN or TD (as identified in the TDI field 608—FIG. 6). On receipt of a TLS ring local packet, an iPT card 24, as described above with reference to the TLS/IP packets, a receiving (i.e., egress) iPT card 24 will "learn" about the sending entity, storing this information in its FDRT. Similarly, ingress iPT cards 24 will, upon receipt of a customer's frame, learn about local connected devices storing this information also in the FDRT of the iPT card 24.

If upon receipt of a customer's data frame an ingress iPT card 24 determines that the ultimate destination is a locally connected device, the frame will not be encapsulated by the iPT card 24 nor forwarded onto a ring 22 since the destination device is connected to the same LAN as the sending device.

If the MAC address and destination port of the egress iPT card is known (i.e., the FDRT of the ingress iPT card has entries based on the destination MAC address of the ultimate destination entity stored within the ingress Ethernet frame), the ingress iPT card 24 will populate TLS ring-local header with the appropriate information. On receipt of the encapsulated Ethernet frame, the egress iPT card will: (1) update the egress iPT card's FDRT, if necessary; and (2) de-encapsulate the Ethernet frame and forward the frame to the appropriate receiving entity.

It should be noted that while the TLS local ring packets are described herein as being used only in association with a TLS having all network elements (i.e., iPT cards) on a single ring, the TLS local ring packets could also be used in association with TLS having network elements dispersed across many rings. However, due to the scalability of IP, use of the TLS/IP headers in this latter configuration is preferred. Similarly, the TLS/IP headers, while described as being used in association with a multiple ring topography, the TLS/IP headers could also be used in a local ring configuration. However, due to the increased overhead required with the TLS/IP headers, use of the TLS local ring headers for a local ring configuration may be preferred.

Accordingly, if TLS local ring packets are used for inter-ring communication, a TLS local ring packet will be transmitted from an iPT card 24 on a local ring 22 to CO 18. At CO 18 the TLS local ring packet will pass through a first NNI port 200 (FIG. 2B) of an iPT card forming part of CO 18B for example, connecting a local ring, such as ring 22C, to inter-ring 20. The TLS local ring packets are translated into a format (described in greater detail with reference to FIG. 7B) which can be accepted and processed by routing switch 204 and then passed to a second NNI 202 where the translated packet is translated back into a TLS local ring packet. These "re-translated" TLS local ring packets then pass from inter-ring 20 to a second local ring, such as ring 22A, via a first NNI port 200, routing switch 204 and second NNI 202 of a second iPT card forming part of CO 18A connecting local ring 22A to inter-ring 20. The translation from a TLS local packet into a format acceptable to a routing switch 204 forming part of CO 18A and then back to a TLS local ring packet is again performed. These inter-ring TLS local ring packets are then transmitted to a destined LAN through a UNI port of an iPT card connecting local ring 22A to the destined LAN.

Briefly and in overview, each TD represents a distinct set of virtual ports, such as the Ethernet ports described above. Each virtual port is a member of only a single distinct set of virtual ports and therefore each virtual port is only associated with a single TD. The set of virtual ports associated with a TD is assigned a multicast group address as described heretofore. In the present instance, the multicast group address is either an IP multicast group address for inter-ring VPNs or a TLS local ring multicast group address for local-ring VPNs. Prior to the routing of a packet between LANs forming part of the VPN, each packet is associated with the TD associated with the virtual port in which the packet enters the iPT network (i.e., the ingress virtual port). The packet can only be routed to another virtual port that is also a member of the distinct set of virtual ports associated with the TD of which the ingress virtual port is also a member. Consequently, the routing of packets is restricted to those virtual ports forming the VPN of a particular customer. As a result of this routing technique, the VPNs of various customers are isolated from each other.

As described above, the TLS network service described herein encapsulates conventional LAN data frames, such as Ethernet frames, for transport across TLS network 10 which may be comprised of a plurality of local rings 22 and inter-rings 20, an exemplary embodiment of which is illustrated in FIG. 2A.

iPT card 24 interconnects a LAN to a local ring 22 (FIG. 2A). Accordingly, and referencing FIG. 3, iPT 24 comprises an input port, such as conventional LAN interface 32, an output port 34 for transmitting data to local ring 22, which as described above may be implemented in co-operation with a conventional SONET ADM, a processor 36 for providing packet reception and transmission facilities, packet header analysis and packet encapsulation facilities described herein, and memory 38 which is in communication with processor 36 which provides sufficient storage for data storage (including providing storage for the Filtering Database Routing Table described hereinafter), instruction storage and packet buffering. As will be appreciated, memory 38 may consist of conventional volatile and non-volatile memory including RAM, ROM, removable and fixed storage devices (such as hard disk drives, optical drives, and removable media and the associated media readers).

Figure 4:
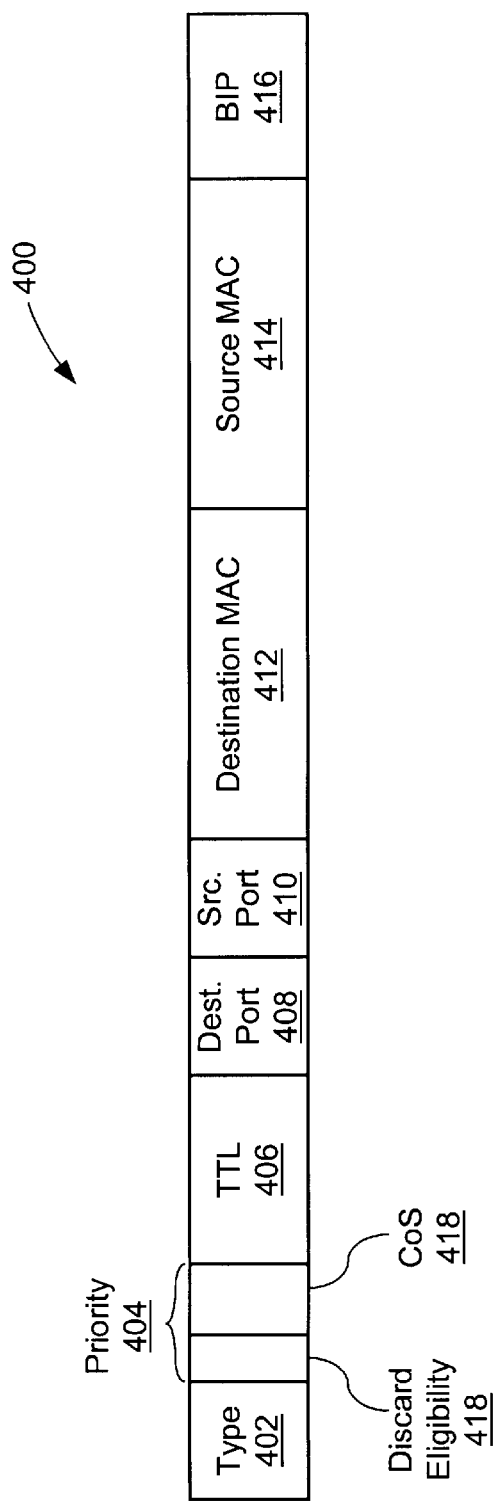
FIG. 4 is a data structure embodying one aspect of the present invention and used in the network of FIG. 1.

FIG. 4 illustrates an exemplary iPT header 400 which can implement, in part, the present invention. Persons skilled in the art will appreciate that the fields, bit lengths of these fields and the overall organization may be modified, enhanced or otherwise altered while still falling within the scope of the present invention.

iPT header 400 comprises eight fields totaling sixteen bytes (eight bits per byte). These eight fields include: type field 402 having a bit length of four bits; priority field 404 having four bits and divided into a single bit discard eligibility field 418 and a three bit Class of Service (CoS) field 320; time-to-live field 406 having an eight bit length; four bit destination port field 408; four bit source port field 410, forty-eight bit destination MAC address field 412; forty-eight bit source MAC address field 414; and eight bit Bit Interleaved Parity (BIP) field 416.

iPT header 400 is "prepended" (i.e., appended as a prefix) to a standard LAN data frame 500, such as, for example, a customer's Ethernet frame which may comply with IEEE 802.3 Ethernet standards, the contents of which are hereby incorporated herein. iPT header 400 can be used to encapsulate a customer frame into one of three TLS encapsulated frames, each illustrated in FIG. 5. TLS frame type zero 510 encapsulates the LAN data frame by prepending iPT header 400 to the data packet. TLS frame type one 520 also prepends iPT header 400 to the LAN data frame together with TLS header 600 (FIG. 6). TLS frame type two 530, in addition to the prepending iPT header 400 and TLS header 600, also prepends an IP header 508, such as, for example IP version 4 (described in RFC 791, the contents of which are hereby incorporated herein).

The three types of TLS frames 510, 520 and 530 are used in different environments. As described above, a VPN forming part of iPT network 10 (FIG. 1) can operate under one of two modes: a local ring TLS mode wherein, preferably, all of the LANs of a VPN are connected to a single local ring such as, for example, VPN 16 which has all of its member LANs connected to a single local ring—local ring 22C (FIG. 2A); or the VPN can operate as a TLS/IP inter-ring TLS mode wherein the LANs comprising the VPN are, preferably, distributed amongst many local rings. VPN 12 is an example of a VPN operating in TLS/IP inter-ring mode since its member LANs are distributed amongst local rings 22A, 22B and 22C (FIG. 2A). TLS packet 520 is designed for operation in the local ring TLS mode and TLS packet 530 is designed for operation in the TLS/IP inter-ring mode. TLS packet 530 could, in the alternative, be used for intra-ring communication instead of TLS packet 520. However, intra-ring use of TLS packet 530 would incur a larger overhead than TLS packet 520. TLS packet 510, which only prepends iPT header 400 to customer frame 500, given its low overhead (as compared to frames 520 and 530), may be used for applications such as router interconnect on a single shared media ring. TLS packet 510 represents a third mode of operation, namely an iPT Ethernet mode which is intended for low overhead communications between, for example, routers an a ring 22 (FIG. 2A). TLS packet 510 can also be used where customer separation requirements are not a concern.

As described above, a VPN embodying the invention can be configured as either a TLS local-ring network or TLS/IP inter-ring network. As a consequence, each UNI port forming part of the TD or VPN is configured in either the corresponding local-ring mode or inter-ring mode. That is, each UNI port will be configured to accept only those data frame structures complying with either the TLS/IP inter-ring header format 530 (FIG. 5)—if the UNI port forms part of an inter-ring VPN, or data structures complying with the TLS ring-local header format 520 (FIG. 5)—the UNI port forms part of a local ring VPN. All ports in a given TD must be similarly configured. That is, all of the UNI ports forming part of the TD network must be configured in the TLS local-ring mode or all UNI ports must be configured in the TLS inter-ring mode.

Each UNI port forming part of an iPT card 24 (FIG. 2A), in addition to operating in either local-ring or inter-ring mode, can be configured as having either a "mapped" type or a "transparent" type.

A transparent port type provides to the user a completely transparent operation of the VPN. A transparently configured UNI port will accept all frames received as input from an attached LAN that have: valid destination and source MAC addresses incorporated in the data frame 500 (e.g., Ethernet frame); an acceptable frame length; and an acceptable frame check sequence (FCS) 502 (FIG. 5) appended to the end of the data frame. Upon ingress into an iPT card, the data frame will be encapsulated into a packet complying with one of packets 510, 520 or 530. On egress from an iPT card (and an associated virtual port), the encapsulated data frame will be de-encapsulated and transmitted over a LAN to its destination. It should be noted that the substantive portion of the data frame 500 (i.e., those portions not including FCS 502) will not be modified by the iPT card. Thus, FCS 502 will be stripped from frame 500 and the remaining portion of the data frame will be encapsulated to comply with data structures 510, 520 or 530 and have a cyclic redundancy checksum (CRC) 504 (or, in the alternative, other frame check sequence) appended to the encapsulated frame. On egress from an iPT card 24, a data packet complying with one of packets 510, 520 or 530 will have the various headers (i.e. iPT header 400, TLS header 600 and/or IP header 510) and appended CRC 504 stripped and the original FCS 502 re-generated and appended to data frame 500.

Transparent UNI ports may also be configured to accept Q-tagged data frames 500. As is known in the art a Q-tag is a two byte identifier described in IEEE standard 802.1Q, the contents of which are hereby incorporated herein. The Q-tag includes twelve bits for a VLAN identifier (thereby limiting an NSP to 4095 VLANs) and a three bit user priority indicator. The Q-tag is added to a standard Ethernet frame in order to identify a particular VLAN and a required user priority for the frame to which the Q-tag is associated. A transparently configured UNI port accepting frames with Q-tags will map the requested three bit user priority indicator to a Class of Service (CoS) indicator (defined in RFC 1122 and IEEE 802.1p, the contents of which are hereby incorporated herein) supported by the UNI port. As is known in the art, a CoS is a manner of managing traffic in a network by grouping similar types of traffic (e.g., e-mail, streaming video, voice, file transfer, etc.) together and treating each type as a class each with its own level of service priority. Unlike QoS traffic management, CoS does not guarantee a level of service (as defined by bandwidth and delivery time). Rather, a CoS provides a "best-effort" delivery scheme that is simpler to manage and more scalable as a network, such as iPN 10 (FIG. 1), grows in structure and traffic volume.

If a UNI port is not configured as a transparent port then the port must be configured as a mapped port. A mapped port enables the mapping of the twelve bit VLAN identifier portion of Q-tagged data frames to a TD Identifier 608 (FIG. 6). Each UNI port configured as a mapped port will store a table that maps the VLAN identifier portion of the Q-tag to a corresponding TDI 608 (FIG. 6). The mapping is on a 1:1 basis. That is, for each VLAN identifier in a Q-tag received by a mapped UNI port there is a corresponding unique TD Identifier 608. Mapped UNI ports enable carriers that previously provided TLS in accordance with the IEEE 802.1Q standard to implement the present invention to customers and with legacy equipment without any disruption in the service provided.

Figure 3:
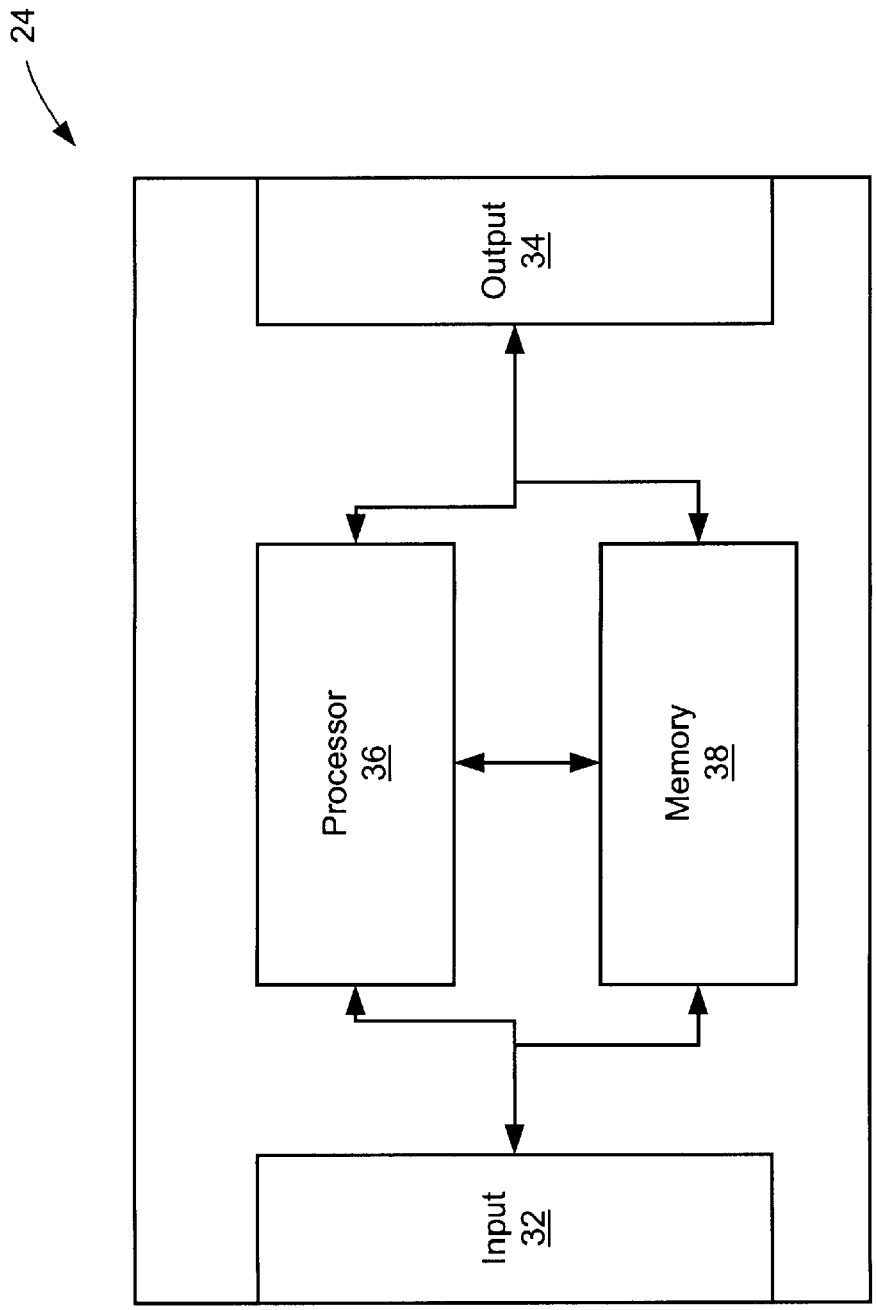
FIG. 3 is a detailed schematic of a portion of FIG. 2A.

Referencing FIGS. 3, 4 and 5, iPT header 400 includes type field 402. Four bit type field 402 identifies the encapsulated packet type (i.e., frame type 510, 520 or 530). Packet type 510 may be represented by the value 0000b, packet type 520 by 0001b, and packet type 530 by 0010b. Other packet types may be developed and identified by the remaining values for type field 402.

As noted above, all UNI ports for a single TD or VPN will be configured similarly (i.e., all packets for the TD will incorporate the same value in type field 402). However, and as described above, a single iPT card 24 (FIG. 2A) may provide for many virtual ports, such as UNI ports. Each of the UNI ports provided by a single iPT card 24 can be assigned to separate TDs or VPNs. As described above, each UNI port will be configured to accept only one type of data packet. A data packet's iPT header is analyzed to determine the value of type field 402. If the value stored type field 402 corresponds to the configuration of the UNI port (i.e., the value in type field 402 identifies a data packet that is acceptable to the UNI port), the data packet will be processed. Otherwise the data packet will be discarded. Accordingly, a single iPT card 24 providing service to a plurality of TDs may receive data frames each encapsulated with any one of the packet types (such as packet types 510, 520 and 530) identified in type field 402 and supported by the implementation of the present invention.

Priority field 404 comprises discard eligibility field 418 and CoS indicator field 320. Discard eligibility field 418, defined by a single bit, provides for discard of marked frames in times of congestion. As described above, CoS indicator 320, having three bits, defines up to eight classes of data. The CoS field can be populated based on data retrieved from the iPT card's stored mapping frame or packet attributes to the CoS field.

Time-to-live (TTL) field 406 is an eight bit field that is decremented at each hop in the network. Once this value is decremented to zero, the packet is discarded.

Destination and source ports 408 and 410, respectively, are four bit fields that identify a particular virtual port on an iPT card 24. Accordingly, each iPT card 24 may service up to sixteen separate virtual ports. When populated, source port field 410 identifies the source port of the sending or ingress iPT card 24 servicing a particular TD or VPN. This source port field will be used by each egress iPT card 24 receiving a packet incorporating an iPT header 400 to dynamically learn the addresses of the other members of a particular TD or VPN. Thus, source port field 410 is used by an iPT card 24 (FIG. 2A) receiving a data packet incorporating TLS header 400 to populate its FDRT. Destination port field 408 will, if known, be populated with the port address of the destination iPT card. If the port address is unknown, the destination port address is overloaded (i.e., set to 1111b) and an appropriate multicast message is sent, as described below. As will be apparent, the choice of port field bit length is arbitrary and may be increased to support additional virtual ports.

Destination and source MAC addresses 412 and 414, respectively, incorporate standard forty-eight bit MAC addresses for the destination device (i.e., the MAC address of the destination or egress iPT card 24—FIG. 2A) and the MAC address of the sending device or source (i.e., the MAC address of the sending or ingress iPT card 24—FIG. 2A). The MAC addresses of iPT cards 24 can be, if desired, assigned by the manufacturer of iPT card 24 prior to shipment easing management of the network. The source MAC address 414 is used by the receiving iPT card 24, in addition to the source port field 410, to populate its FDRT.

BIP field 416 is used to check for the integrity of iPT header 400 at each "hop" during a packet's routing through iPN 10. BIP field 416 is generated at each hop as TTL field 406 decrements.

Referencing FIGS. 5 and 6, TLS local ring and TLS/IP inter-ring data packet header 520 and 530 incorporate a six byte TLS header 600. TLS header 600 has a twenty-four bit TD Identifier (TDI) entered into TDI field 608. As described above, the TDI is an identifier that is unique to the TD on a particular NSP's network. Since TDI field 608 has bit length of twenty-four bits, a maximum of $1.6 \times 10^7$ TDs or VPNs can be offered by a single NSP. However, sixteen bits of TLS header 600 have been reserved in reserved field 606 to provide for additional semantics or, if desired, an extended TDI field 608. In the event that reserved field 606 is used for an extended TDI, a single NSP would be able to provision over a trillion separate VPNs. Since it is considered-that reserved field 606 may be used, in the future, as an extended address space for the TDI, if any packet forwarding or manipulation decisions are to be performed in hardware, the hardware should be designed to accommodate this future growth.

Flags field 604 comprises a single bit port type field 614 and a single bit data type field 616. Port type field 614 identifies if the data packet is destined for a transparent or mapped UNI port. For example, a data packet encapsulated in a TLS local ring data header 520 or TLS/IP inter-ring data header 530 may have all packets destined for transparently configured UNI ports with a value of zero stored in port type field 614 and all data packets destined for mapped ports having a 1b stored in port type field 614. As indicated before, all UNI ports forming part of single TDI or VPN will have all its UNI ports configured similarly (i.e., all UNI ports will either be configured as transparent ports or all UNI ports will be configured as mapped ports). Accordingly, all packets transmitted on a single TDI will have the same value entered in port type field 614.

Single bit data type field 616 of flags field 604 identifies whether the packet includes data or control information for the iPT card 24 (FIG. 2A).

The six bit version field 602 can be used to indicate the version of the protocol embodying the present invention. For example, the value inserted in version field 602 may be set to, for example, b010000 when the standard (i.e., twenty-four bit) length for the TDI is used and inserted only in TDI field 608. However, an enhanced embodiment of the present invention using reserved field 606 together with TDI field 608 to identify a single forty bit TDI could be represented by a different value (e.g., 0001b) inserted in version field 602.

TLS header 600 (FIG. 6) is, in addition to iPT header 400 (FIG. 3), prepended to a LAN data frame 500 (such as, for example, an Ethernet frame) for a TLN or VPN operating in either local ring mode, which uses TLS local ring header 520, or in inter-ring mode, using TLS/IP inter-ring header 530. TLS/IP inter-ring header 530, as described above, also incorporates a standard IP header 508. IP header 508 may comprise a standard twenty byte IP header, such as an IPv4 compliant header. IP header 508 would itself comprise the standard fields including those fields identified in IPv4 (referenced above) and known to those skilled in the art. The protocol field portion of IP header 508 should include a value that is specific to the iPN system described herein.

As described above, ingress iPT cards 24 (FIG. 2A) determine the destination for a LAN data frame 500 received from a LAN in communication with the ingress iPT card 24 based on the destination MAC address contained within LAN data frame 500 and entries associated with the destination MAC address stored in each iPT card's FDRT. Moreover, the FDRT is updated or the associations are learned based on traffic received by an iPT card 24. For an IP data packet received by an iPT card 24, the IP source address incorporated in IP header 508 will, in addition to source MAC address 414 and source port field 400, be used to populate FDRT.

Based on the foregoing description, it is apparent an ingress iPT card 24 (FIG. 2A) will, for each LAN data frame 500 (FIG. 5) incorporating, if known, a conventional destination MAC address (i.e., a destination MAC address for the ultimate destination) received from a sending device connected to a LAN connected to the ingress iPT card 24, access its stored FDRT. On accessing its FDRT, the ingress iPT card 24 will, based on the destination MAC address incorporated in the Ethernet frame 500, determine, if possible, a destination MAC address for the egress iPT card 24 which is in communication with the ultimate destination, a destination port address on the egress iPT card 24 associated with the ultimate destination and, if necessary (i.e., for inter-ring communications), a destination IP address. The retrieved MAC address of the egress iPT card, the destination port address and, if necessary, the retrieved destination IP address will then be used, respectively, to populate destination MAC field 412 (FIG. 3), destination port field 408 both of iPT header 600, and if required, IP header 508 (FIG. 5), to encapsulate LAN data frame 500 received by ingress iPT card 24.

Upon receipt of an encapsulated LAN data frame, an egress iPT card 24 will strip prepended headers (i.e., iPT header 400, TLS header 600, and if used, IP header 508) from the received packet. Egress iPT card 24 will then analyze the LAN data frame 500 for the original sender's source MAC address. If egress iPT card 24 does not have an entry in its FDRT for the sender's source MAC address, then the egress iPT card 24 will update its FDRT by associating the sender's source MAC address with the: source MAC address 414 (FIG. 3) of the ingress iPT card 24; source port 410 of the ingress iPT card 24; and, if included, the IP address of the ingress iPT card 24 stored in IP header 508.

In this manner, the FDRT of a receiving (i.e., egress) iPT card 24 is updated.

In the instance where the ingress iPT card 24 has no entry in its FDRT for the ultimate destination MAC address, then the ingress iPT card 24 will populate: the destination MAC address field 412 (representing a destination or egress iPT card 24) with a layer two multicast address for TLS/IP frames and layer two multicast address for TLS local ring frames; the destination port field 408 with an overload (i.e., 1111b); and, if required (i.e., the receiving UNI port of the ingress iPT card is configured to operate in inter-ring mode), the destination IP address portion of IP header 508 with a multicast IP address associated with that TD thereby ensuring that all iPT cards 24 forming part of a customer's VPN or TD and the ultimate destination will receive the encapsulated message. Each iPT card 24 of the VPN or TD receiving such a multicast or broadcast message will access their FDRTs and, if necessary, update their FDRT to associate the original sending device's source MAC address with the MAC, port and, if used, IP addresses of the ingress iPT card.

In TLS ring-local mode, a broadcast TLS ring local data packet 520 will be received by all members of a VPN or TD. Each iPT card that is a member of the VPN identified by the TD identifier (stored in TDI field 608—FIG. 6) will update their FDRTs based on the sending entity's MAC address (stored in the Ethernet frame), the ingress iPT card's source MAC address from source MAC address field 414 and the source port associated with the TD as stored in source port field 410. An egress iPT card receiving a non-broadcast data packet 520 will also update its FDRT in the same manner.

As will be appreciated, it may be desirable to maintain entries in the FDRT for as long as possible, thus minimizing the flooding of multicast packets throughout a VPN or TD. However, maintaining entries in an FDRT indefinitely may cause the FDRT to increase to an unwieldy size, and may cause problems as equipment (such as a sending device or iPT card 24) is moved, removed or replaced. Accordingly, it may be desirable to have entries in the FDRT time out (that is, expire after a given period of disuse). The time out period should, if implemented, be configurable based on the deployment environment.

Where there is no time out for FDRTs, or the time out period is long, problems associated with equipment being moved or removed may be accommodated, as follows. In accordance with standard LAN protocol, the address of a new device added to the LAN becomes known to the LAN. Similarly, when a device is removed, this fact is communicated in the LAN. Through this mechanism, the UNI port servicing the LAN will learn of the change. In response, the UNI port may multicast a "MAC registration" control message to all UNI ports of the VPN advising of the change. Where, for example, a device was removed, this would result in a control message which causes the recipient UNI ports to delete any entry in their FDRT table for the MAC address of the removed device. In the case of a new device, the recipient UNI ports would add an entry to their FDRT table for the new device.

A MAC registration control message could also be sent by a UNI port to apprise a specific other UNI port of the VPN of a change. Such a message could be sent in response to a request form this other UNI port.

As described in conjunction with FIG. 6, data type flag 616 of the TLS header 600 for messages indicates whether the message is a data message or a control message. To send information advising of a change in a device on a LAN, this flag is set to indicate a control message and the message body contains the control information.

Another control message which may be used on a VPN is a multicast flush control message. A flush control message is used to avoid out-of-sequence packets which can otherwise arise when multicast packets are interspersed with unicast packets, since multicasting pathways are typically slower than unicasting pathways. Out-of-sequence packets can cause problems in networks running on some network protocols (such as System Network Architecture—SNA—by IBM). The protocol is as follows. After a UNI port multicasts on the VPN it typically receives a reply packet from the destination device. This allows the UNI port to update its FDRT to permit unicasting to the destination device. Updating of the FDRT based on a data message prompts the UNI port to send a flush control message on the multicast path and, thereafter, to queue (or, if necessary, drop) any messages to the destination device until a response is received to the flush control message. Since the flush control message is sent on the same pathways as the original multicast message, it will reach the UNI port for the destination device after the original multicast message. On receiving the flush control message, the destination UNI port uses the contents of the message in constructing a flush reply control message which is unicast back to the source UNI port. Once the source UNI port receives the reply, it can begin to unicast to the destination device served by the destination UNI port.

Note that there is a possibility of the source UNI port receiving no reply to a flush control message. To accommodate such a possibility, a count down timer may be launched when a flush control message is sent. If there is no reply to the flush control message by the time the timer times out, the source UNI port will be freed to begin unicasting to the destination device.

While the TTL field 406 (FIG. 4) avoids the prospect of multicast packets infinitely looping around a VPN, there is the possibility of two UNI ports becoming bridged at ethernet layer 2 (L2). Should this occur, then there are two potential problems. Firstly, since L2 broadcast messages are common and there is no TTL field in ethernet L2 messages, these broadcast messages could infinitely loop and crowd out legitimate message traffic on a VPN. Secondly, should the bridge occur between UNI ports of differing VPNs, customer security issues can arise.

To guard against these problems, each UNI port in a VPN periodically sends a loopback packet to the ethernet L2 broadcast address of the LAN to which it is connected so that the loopback packet propagates everywhere in the LAN. The loopback packet identifies the sending UNI port (with its IP address) and sending VPN (with its TDI). If the LAN is working properly, the loopback packet should not return to either the UNI port which sent it nor should to any other UNI port. If a UNI port does receive a loopback packet, it raises an alarm. It may also shut down. In this regard, a UNI port may check a received loopback packet to determine whether or not the packet originated from its VPN. If not, the security of the VPN is compromised and it may be desirable to configure the UNI port to shut down in such circumstances. The receiving UNI port also checks whether the source of the loopback packet was itself. If so, and if the port is configured to shut down in such circumstances, to allow recovery from transient loops, it is preferred that the shut down port, while not passing any messaging traffic, will continue to receive and transmit loopback packets. Then, if a certain period of time elapses without further problem, the port can come back on line.

Note that while in normal circumstances a Spanning Tree can be used to avoid loops, a bridge can affect operation of the Spanning Tree protocol. Hence provisioning of loopback packets is preferred.

As described heretofore, a port on an iPT card 24 (FIG. 2A) may be configured as either a UNI port (described above) or as a Network-Network Interface (NNI) port. A NNI, which may form part of CO 18 (FIG. 2B) such NNIs 200 and 202, is intended to connect elements that form the transport network (i.e., iPN 10—FIG. 1). The NNI port, which will form part of a VPN or TD, will not encapsulate incoming frames as encapsulation has already been performed on ingress into the TLN by a UNI port.

Upon receipt of a TLS/IP packet 530 (FIG. 5), an NNI port, such as NNIs 200 and 204, forming part of CO 18 (FIG. 2B) will map the iPT header 400 to an Ethernet-2 packet 700 illustrated in FIG. 7A. Ethernet-2 packet 700 maps iPT header 400 to MAC destination address 702, MAC source destination address 704 and protocol type ET 706 being two bytes in length.

For TLS/IP frames only, on egress from NNI (e.g., from NNI 200 to routing switch 204—FIG. 2B), iPT header 400 is stripped from the outgoing packet and replaced with the Ethernet-2 header 700. The source MAC address 414 (FIG. 4) is mapped directly to MAC source address 704. Destination address 702 is an address stored in the NNI's FDRT which is based on the iPT card's destination MAC address 412, and destination port address 410. Once Ethernet-2 header 700 has been generated and prepended to the remaining portion of the outgoing data packet the revised packet is re-transmitted by the NNI to a routing switch 204 and routed in a conventional fashion to a second NNI 202. The direct mapping of MAC source address 418 to MAC source address 704 ensures that ingress iPT cards 24 can properly update its FDRT.

A data packet received by an NNI port that has an Ethernet-2 header 700 (i.e., the packet has been received by NNI 202 from another NNI port 200 via a routing switch 204) reverses the above described mapping. That is, Ethernet-2 header 700 is stripped off and mapped to an iPT header 400. Thus, MAC source address 704 is mapped to the MAC source address of the ingress of the NNI port 200. Similar to ingress data packets received from a UNI port, MAC destination address 412 is the result the data retrieved from the NNI's FDRT which reverses the mapping described above. Ethernet-2 header 700 is used to reduce overhead in communications between NNIs.

Similar to Ethernet-2 header 700 being a translation of TLS/IP header 520 (FIG. 5), TLS local ring Ethernet-2 header 720 (FIG. 7B) is a translation of TLS ring local header 520 (FIG. 5). On receipt of a packet with TLS ring local header 520, a NNI, such as NNI 200, will translate the packet to conform with the TLS local ring Ethernet-2 header 720 so that the packet can be processed by a routing switch 204 (FIG. 2B). In this translation, the iPT 400 and TLS 600 header are stripped and the LAN data frame 500, which comprises a MAC destination address 722 and MAC source address 724, and other payload data 726, is analyzed. A translated packet is formed from the destination and source MAC addresses 722 and 724, a first protocol packet (ET) 730, a Q-Tag 732, a second ET 734, the TLS header 600 and the payload 726. This translated packet is then routed by routing switch 204 to a second NNI 202 of CO 18. The translated packet is received by second NNI 202 where a TLS Ring local packet 520 is re-generated. The re-generated TLS ring local packet 520 can then be forwarded to a UNI port of an iPT card 24 as described heretofore. In an alternative embodiment, source and destination MAC addresses of Ethernet-2 header 720 could be populated with the destination and source addresses of a source and destination iPT card 24 rather than the source and destination of the sending and receiving devices.

As will be appreciated, the functions described herein can be re-distributed between the sending entity, ingress iPT card, egress iPT card, receiving entity and central offices described herein while falling within the sphere and scope of the invention.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

We claim:

1. A system of providing communication between a first and a second Local Area Network (LAN), said first and second LANs interconnected by a connectionless network, said system comprising:

a first network interface connecting said first LAN to said connectionless network, said first receiving device for:
  receiving conventional LAN data frames;
  determining an address of a second network interface responsive to destination information in said received conventional LAN data frames, said second network interface connecting said second LAN to said connectionless network; and
  encapsulating said conventional LAN data frames received at said first network interface with said address of said second network interface;

a router for routing said conventional LAN data frames encapsulated with said address to said second network interface over said connectionless network;

said second network interface connecting said second LAN to said connectionless network, said second network interface for:
  receiving conventional LAN data frames encapsulated with said address;
  re-generating said conventional LAN data frames from said conventional LAN data frames encapsulated with said address; and
  transmitting said re-generated conventional LAN data frames to said second LAN; and
  wherein said determining comprises:
    determining an identifier uniquely identifying a virtual private network (VPN) comprising at least said first and second LANs;
    accessing a routing table stored at said first network interface;
    where possible, retrieving, from said routing table a unique address of said second network interface responsive to a destination address stored in said received LAN data frames and said determined identifier, said unique address comprising an IP address; and
    if said routing table does not contain said unique address for said destination information, retrieving a multicast address, said multicast address representative of all LANs forming part of said VPN and comprises an IP multicast address; and
  wherein said encapsulating comprises encapsulating said conventional LAN data frames with said determined identifier and one of said unique address of said second network interface and said multicast address.

2. The system of claim 1 wherein said unique address further comprises:
a Media Access Control (MAC) address of said second network interface; and
wherein said retrieving of said unique address of said second network interface comprises determining, responsive to said identifier identifying said VPN, a destination port on said second network interface servicing said VPN and wherein said encapsulating comprises encapsulating said conventional LAN data frames with said determined destination port.

3. The system of claim 2 wherein said LAN data frames are Ethernet data packets.

4. The system of claim 1 wherein said IP address corresponds to a destination port of said second network interface.

5. The system of claim 1 wherein said connectionless network is a Synchronous Optical Network (SONET) network comprising at least one local ring and wherein said first network interface is in communication with a local ring of said SONET network and said second network interface is in communication with said local ring or another local ring of said SONET network.

6. A device providing communication between a first and a second Local Area Network (LAN), said first and second LANs in communication by a connectionless network, said device comprising:
an input interface in communication with said first LAN;
an output interface in communication with said connectionless network;
a storage media storing data frames received from said first LAN received via said input interface, data packets and frames for transmission to said second LAN through said output interface; and
a processor, said processor adapted to:
receive conventional LAN data frames received from said first LAN through said input interface, said received data frames destined for said second LAN;
determine, responsive to said received conventional LAN data frames, routing information for routing said received conventional LAN data frames to said second LAN, said routing information comprising an Internet Protocol (IP) address;
encapsulate said received conventional LAN data frames with said routing information;
transmit said encapsulated conventional LAN data frames to said connectionless network over said output interface;
receive encapsulated conventional LAN data frames from said connectionless network from said output interface;
generate conventional LAN data frames from said received encapsulated conventional LAN data frames; and
transmit said generated conventional LAN data frames to said first LAN by said input interface.

7. The device of claim 6 wherein said IP address identifies one of an egress device servicing said second LAN and a destination port of said egress device.

8. The device of claim 7 wherein said memory stores a routing table, said routing table associating destination addresses incorporated in said received conventional LAN data frames, with said routing information, and wherein said processor adapted to determine said routing information accesses and retrieves said routing information from said routing table.

9. The device of claim 8 wherein said processor is further adapted to:
update said routing table responsive to said received encapsulated conventional LAN data frames.

10. The device of claim 9 wherein said processor is further adapted to:
where said routing table contains no routing information associated with said second LAN, encapsulate said received conventional LAN data frames with said routing information with an IP multicast address.

11. The device of claim 10 wherein said conventional LAN data frames are Ethernet frames.

12. The device of claim 11 wherein said connectionless network is a Synchronous Optical Network (SONET) network comprising at least one local ring and wherein said output interface is in communication with a local ring of said SONET network and said second LAN is in communication with said local ring or another local ring of said SONET network.

13. A method of transmitting conventional Local Area Network (LAN) data frames from a first to a second LAN, said first and second LAN interconnected by a connectionless medium, said method comprising:
receiving said conventional LAN data frames from said first LAN destined for said second LAN;
determining, responsive to said received conventional LAN data frames, routing information for transmittal of said conventional LAN data frames to said second LAN;
encapsulating said received conventional LAN data frames with said routing information;
transmitting said encapsulated received conventional LAN data frames to said connectionless medium;
receiving encapsulated conventional LAN data frames from said connectionless medium destined for said first LAN;
generating conventional LAN data frames responsive to said received encapsulated conventional LAN data frames; and
transmitting said generated conventional LAN data frames to said first LAN;
wherein said determining routing information comprises:
determining an identifier uniquely identifying a VPN comprising said first LAN and second LAN;
determining from said received conventional LAN data frames the destination for said received conventional LAN data frames; and
retrieving, from a database and responsive to said determined destination, an Internet Protocol (IP) address of an egress location forming part of said connectionless medium servicing said determined destination, if said database does not contain an entry for said determined destination, said retrieved address comprising an IP multicast address comprising egress locations servicing said VPN.

14. The method of claim 13 wherein said receiving of said conventional LAN data frames from said first LAN, said encapsulating of said received conventional LAN data frames, and said transmitting of said encapsulated LAN data frames to said connectionless medium is performed by an ingress location servicing said VPN and forming part of said connectionless medium.

15. The method of claim 13 wherein said address retrieved from said database comprises one of a unicast IP address of said egress location and an IP multicast address comprising said egress locations servicing said VPN.

16. The method of claim 15 wherein each of said ingress and egress locations maintain independent databases storing egress addresses.

17. The method of claim 16 further comprising:
updating said database of said ingress location with address information stored in said receiving conventional LAN data frames.

18. The method of claim 16 further comprising:
updating said database of said egress location with address information stored in said received encapsulated conventional LAN data frames.

19. The method of claim 18 wherein said address information stored in said received encapsulated conventional LAN data frames comprises an address of a sending device forming part of said first LAN and an IP address of said ingress location.

20. The method of claim 18 wherein said IP address of said egress location identifies a destination port of said egress location and said IP address of said ingress location identifies a source port of said ingress location.

21. A method for facilitating communication in a virtual private network (VPN), said VPN comprising a plurality of local area networks (LANs) each interconnected through a network interface to a connectionless network, comprising, at a first network interface of a first LAN of said VPN:
receiving conventional LAN data frames on said first LAN, said conventional LAN data frames having destination information;
determining an identifier uniquely identifying said VPN;
searching a routing table with said destination information and said identifier for a unique IP address of another network interface of another LAN of said VPN;
if said routing table does not contain said unique address, retrieving a multicast IP address for all network interfaces of said plurality of LANs of said VPN;
encapsulating said conventional LAN data frames with said identifier and one of said unique IP address and said multicast IP address; and
transmitting said encapsulated frames on said connectionless network.

22. The method of claim 21 further comprising:
receiving encapsulated frames from said connectionless network;
for each of said received encapsulated frames:
generating a conventional LAN data frame from said received encapsulated frame; and
transmitting said generated conventional LAN data frame to said first LAN.

23. The method of claim 22 further comprising on generating a conventional LAN data frame from said received encapsulated frame, updating said routing table with source address information stored in said conventional LAN data frame.

24. The method of claim 23 wherein said source address information stored in said conventional LAN data frames comprises source MAC address information.

25. The method of claim 23 further comprising on receipt of said encapsulated frames, updating said routing table with source information stored in said encapsulated LAN data frames.

26. The method of claim 25 wherein said source information stored in said encapsulated LAN data frames comprises a source MAC address of a device forming part of said second LAN and an address information associated with a network interface of said second LAN.

27. The method of claim 26 wherein said address information associated with said network interface of said second LAN comprises an IP address of one of said network interface of said second LAN and a destination port of said network interface of said second LAN.

28. The method of claim 26 wherein said address information associated with said network interface of said second LAN comprises a network interface MAC address.

29. A first network interface for a first local area network (LAN) of a virtual private network (VPN), said VPN comprising a plurality of LANs each interconnected through a network interface to a connectionless network, comprising:
means for receiving conventional LAN data frames on said first LAN, said conventional LAN data frames having destination information;
means for determining an identifier uniquely identifying said VPN;
means for searching a routing table with said destination information and said identifier for a unique address of another network interface of another LAN of said VPN, said unique address comprising an IP address of said another network interface;
means for, if said routing table does not contain said unique address, retrieving a multicast address for all network interfaces of said plurality of LANs of said VPN, said multicast address for said all network interfaces comprising a multicast IP address;
means for encapsulating said conventional LAN data frames with said identifier and one of said unique address and said multicast address; and
means for transmitting said encapsulated frames on said connectionless network.

30. The method of claim 29 further comprising:
means for receiving encapsulated frames from said connectionless network;
for each of said received encapsulated frames:
means for generating a conventional LAN data frame from said received encapsulated frame; and
means for transmitting said generated conventional LAN data frame to said first LAN.

31. A Virtual Private Network (VPN) data signal embodied on a carrier wave, said VPN data signal generated from a received conventional LAN data frame, said conventional LAN data frame comprising a LAN destination address, a LAN source address, a LAN payload and a LAN error checking portion, said VPN data signal comprising:
an egress destination address of an egress network interface, said egress network interface servicing an egress destination corresponding to said LAN destination address and wherein said egress destination address comprises an Internet Protocol (IP) address;
an ingress source address of an ingress network interface, said ingress network interface servicing an ingress source corresponding to said LAN source address and wherein said ingress source address comprises an IP address;
said LAN destination address;
said LAN source address;
said LAN payload; and
an error checking portion generated from said egress destination address, said ingress source address, said LAN destination address; and said LAN source address and said LAN payload.

32. The VPN data signal of claim 31 wherein said egress destination address comprises one of a unique IP address for a single egress destination and a multicast IP) address corresponding to a plurality of egress destinations, said plurality of egress destinations including an egress destination servicing said destination corresponding to said LAN destination address.

33. The VPN data signal of claim 31 wherein said egress destination address further comprises a destination Media Access Control (MAC) address corresponding to said egress network interface and a destination port address of a destination port of said egress network interface.

34. The VPN data signal of claim 33 wherein said ingress source address further comprises a source MAC address corresponding to said ingress network interface and a source port address of a source port of said ingress network interface.

35. The VPN data signal of claim 31 wherein said IP address of said egress destination address identifies a destination port of said egress network interface.

36. The VPN data signal of claim 35 wherein said IP address of said ingress source address identifies a source port of said ingress network interface.

37. The VPN data signal of claim 31 further comprising a unique identifier identifying a VPN comprising said egress network interface and said ingress network interface.

38. A system of providing communication between a first and a second Local Area Network (LAN), said first and second LANs interconnected by a connectionless network, said system comprising:
   a first network interface connecting said first LAN to said connectionless network, said first receiving device for:
      receiving conventional LAN data frames;
      determining an address of a second network interface responsive to destination information in said received conventional LAN data frames, said second network interface connecting said second LAN to said connectionless network; and
      encapsulating said conventional LAN data frames received at said first network interface with said address of said second network interface;
   a router for routing said conventional LAN data frames encapsulated with said address to said second network interface over said connectionless network;
   said second network interface connecting said second LAN to said connectionless network, said second network interface for:
      receiving conventional LAN data frames encapsulated with said address;
      re-generating said conventional LAN data frames from said conventional LAN data frames encapsulated with said address; and
      transmitting said re-generated conventional LAN data frames to said second LAN; and
   wherein said determining an address comprises:
      determining an identifier uniquely identifying a virtual private network (VPN) comprising at least said first and second LANs;
      accessing a routing table stored at said first network interface;
      where possible, retrieving, from said routing table a unique address of said second network interface responsive to a destination address stored in said received LAN data frames and said determined identifier, said unique address comprising an IP adderess; and
      if said routing table does not contain said unique address for said destination information, retrieving a multicast address, said multicast address representative of all LANs forming part of said VPN and comprises an IP multicast address; and
   wherein said encapsulating comprises encapsulating said conventional LAN data frames with said determined identifier and one of said unique address of said second network interface and said multicast address; and
   wherein said routing comprises:
      receiving said encapsulated conventional LAN data frames at a first Network Network Interface (NNI) of said router;
      modifying said encapsulated conventional LAN data frames to have a conventional LAN data frame header and LAN data frame payload, said modified encapsulated conventional LAN data frame recognizable by a conventional routing switch of said router;
      routing, by said routing switch, said modified encapsulated LAN data frame to a second NNI of said router;
      generating, at said second NNI, an encapsulated conventional LAN data frame from said modified encapsulated data LAN data frame; and
      transmitting said generated encapsulated conventional LAN data frame to said second network interface.

39. The method of claim 21 wherein said encapsulating also encapsulates address information for said first network interface.

40. The method of claim 39 further comprising:
   receiving an indication a new device has been added to said first LAN and a media access control (MAC) address for said new device;
   generating a control message containing said new device MAC address and said address information for said first network interface;
   encapsulating said control message in said multicast IP address; and
   transmitting said control message on said connectionless network.

41. The method of claim 39 further comprising:
   receiving an indication a device has been removed from said first LAN;
   generating a control message containing said a media access control (MAC) address for said removed device and said address information for said first network interface;
   encapsulating said control message in said multicast IP address; and
   transmitting said control message on said connectionless network.

42. The method of claim 23 wherein said encapsulating also encapsulates address information for said first network interface and further comprising:
   after updating said routing table with source address information on receipt of said convention LAN data frames, transmitting to said multicast IP address a control message including said address information for said first network interface;
   after sending said control message, queuing conventional LAN data frames destined for said source address until a reply to said control message is received.

43. The method of claim 39 further comprising:
   periodically broadcasting a loopback message to said first LAN, said loopback message comprising said address information for said first network interface and said identifier uniquely identifying said VPN.

44. The method of claim 39 further comprising:

receiving at said first network interface a loopback message, said received loopback message having been generated by a generating network interface and broadcast into a LAN associated with said generating network interface; and indicating an error condition.

45. The method of claim 44 wherein said indicating an error condition comprises shutting down said first network interface.

46. The method of claim 44 wherein said received loopback message comprises address information for said generating network interface and further comprising:

determining whether a network interface address of said received loopback message is said first network interface address and, if so, shutting down said first network interface to messaging traffic;

periodically broadcasting a loopback message to said first LAN, said loopback message comprising said address information for said first network interface;

after broadcasting a pre-determined number of loopback messages, if no loopback message is received, reactivating said first network interface to handle messaging traffic.

* * * * *